（12）United States Patent
Reiners et al.

(10) Patent No.: US 12,499,667 B2
(45) Date of Patent: Dec. 16, 2025

(54) SYSTEMS AND METHODS FOR WORKSITE IMAGERY SELECTION

(71) Applicant: Deere & Company, Moline, IL (US)

(72) Inventors: Alexander C. Reiners, Thibodaux, LA (US); John P. Just, Ames, IA (US); Eric M. Heien, Davis, CA (US); Marcos Antonio de Jesus Filho, Napa, CA (US); Matthew J. Burke, Des Moines, IA (US)

(73) Assignee: DEERE & COMPANY, Moline, IL (US)

( * ) Notice: Subject to any disclaimer, the term of this patent is extended or adjusted under 35 U.S.C. 154(b) by 81 days.

(21) Appl. No.: 18/587,243

(22) Filed: Feb. 26, 2024

(65) Prior Publication Data
US 2025/0272963 A1  Aug. 28, 2025

(51) Int. Cl.
*G06V 10/776* (2022.01)
*A01D 41/127* (2006.01)
(Continued)

(52) U.S. Cl.
CPC ......... *G06V 10/776* (2022.01); *A01D 41/127* (2013.01); *G06V 10/40* (2022.01);
(Continued)

(58) Field of Classification Search
CPC .... G06V 10/776; G06V 10/40; G06V 10/774; G06V 10/94; G06V 20/188; A01D 41/127
See application file for complete search history.

(56) References Cited

U.S. PATENT DOCUMENTS 5,995,895 A * 11/1999 Watt ..................... G05D 1/0274
  56/10.2 G
8,527,157 B2  9/2013 Imhof et al.
(Continued)

FOREIGN PATENT DOCUMENTS

EP  3469878 A1  4/2019
WO  2023282787 A1  1/2023

OTHER PUBLICATIONS

Prosecution History of U.S. Appl. No. 16/360,691 including: Application and Drawings filed on Apr. 10, 2019 and Notice of Allowance dated Aug. 18, 2021, 47 pages.
(Continued)

*Primary Examiner* — Rami Khatib
(74) *Attorney, Agent, or Firm* — Christopher J. Volkmann; KELLY, HOLT & CHRISTENSON PLLC

(57) ABSTRACT

A computer implemented method includes obtaining, from one or more image providers, a set of one or more overhead images of a worksite, each overhead image including values indicative of a characteristic at different geographic locations across the worksite; identifying an image performance quality metric for each overhead image based on an image performance quality model; determining if at least one overhead image can be selected, as a selected image, based on the identified image performance quality metrics for the one or more overhead images; selecting, in response to determining that at least one overhead image can be selected, as a selected image, the at least one overhead image and outputting the at least one selected image for use in control of the mobile work machine and generating control signals to control the mobile work machine based, at least, on the at least one selected image.

20 Claims, 14 Drawing Sheets

(51) Int. Cl.
  *G06V 10/40* (2022.01)
  *G06V 10/774* (2022.01)
  *G06V 10/94* (2022.01)
  *G06V 20/10* (2022.01)

(52) U.S. Cl.
  CPC ............ *G06V 10/774* (2022.01); *G06V 10/94* (2022.01); *G06V 20/188* (2022.01)

(56) References Cited

U.S. PATENT DOCUMENTS

| | | | |
|---|---|---|---|
| 10,568,316 | B2 | 2/2020 | Gall et al. |
| 10,684,137 | B2 * | 6/2020 | Kean ........................ G06F 16/51 |
| 10,866,109 | B2 | 12/2020 | Madsen et al. |
| 10,909,368 | B2 | 2/2021 | Guo et al. |
| 2003/0040971 | A1 | 2/2003 | Freedenberg et al. |
| 2005/0149235 | A1 | 7/2005 | Seal et al. |
| 2011/0056178 | A1 | 3/2011 | Sauerwein et al. |
| 2011/0270494 | A1 | 11/2011 | Imhof et al. |
| 2011/0270495 | A1 | 11/2011 | Knapp |
| 2015/0254800 | A1 | 9/2015 | Johnson et al. |
| 2017/0115862 | A1 | 4/2017 | Stratton et al. |
| 2017/0223947 | A1 | 8/2017 | Gall et al. |
| 2017/0318743 | A1 | 11/2017 | Sauder et al. |
| 2018/0101728 | A1 * | 4/2018 | Zhong .................. G06V 10/761 |
| 2018/0129879 | A1 | 5/2018 | Achtelik et al. |
| 2019/0050948 | A1 | 2/2019 | Perry et al. |
| 2019/0114847 | A1 | 4/2019 | Wagner et al. |
| 2019/0129430 | A1 | 5/2019 | Madsen et al. |
| 2020/0323134 | A1 | 10/2020 | Dan et al. |
| 2021/0321566 | A1 | 10/2021 | Darr et al. |
| 2022/0406055 | A1 | 12/2022 | Rooney |

OTHER PUBLICATIONS

U.S. Appl. No. 17/360,747 Application and Drawings filed on Jun. 28, 2021, 42 pages.

* cited by examiner

SYSTEMS AND METHODS FOR WORKSITE IMAGERY SELECTION

FIELD OF THE DESCRIPTION

The present description relates to worksite operations. More specifically, the present description relates to selection of images used for control of work machines that operate in worksite operations.

BACKGROUND

There are a wide variety of different types of work machines, such as agricultural work machines, that perform worksite operations. For example, one type of work machine is an agricultural harvester that performs a harvesting operation at an agricultural worksite (e.g., field). Another type of work machine is a mobile support machine, such as a mobile grain cart or a mobile grain trailer, that operates in a harvesting operation, to receive and transport grain harvested by a harvester. Worksite operations can be planned and machines can be controlled based on characteristics of the worksite. Predictions of worksite characteristics can be used to plan a worksite operation or to predictively control a work machine such that the work machine will have optimized settings for the predicted characteristics. Images of a worksite, such as overhead (e.g., satellite) images of the worksite can indicate or otherwise be used to predict characteristics of a worksite. The images can thus be utilized in worksite operation planning and predictive work machine control.

The discussion above is merely provided for general background information and is not intended to be used as an aid in determining the scope of the claimed subject matter.

SUMMARY

A computer implemented method includes obtaining, from one or more first image providers, one or more first overhead images of a worksite, each first overhead image including values indicative of a characteristic of the worksite at different geographic locations across the worksite; identifying an image performance quality metric for each first overhead image based on an image performance quality model; determining whether one or more of the first overhead images are of sufficient image performance quality based on the identified image performance quality metrics for the one or more first overhead images; selecting one or more selected overhead images of the worksite based on the determination; and generating control signals to control a mobile work machine based, at least, on the one or more selected images.

A computer implemented method includes obtaining, from one or more image providers, a set of one or more overhead images of a worksite, each overhead image including values indicative of a characteristic at different geographic locations across the worksite; identifying an image performance quality metric for each overhead image based on an image performance quality model; determining if at least one overhead image can be selected, as a selected image, based on the identified image performance quality metrics for the one or more overhead images; selecting, in response to determining that at least one overhead image can be selected, as a selected image, the at least one overhead image and outputting the at least one selected image for use in control of the mobile work machine and generating control signals to control the mobile work machine based, at least, on the at least one selected image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
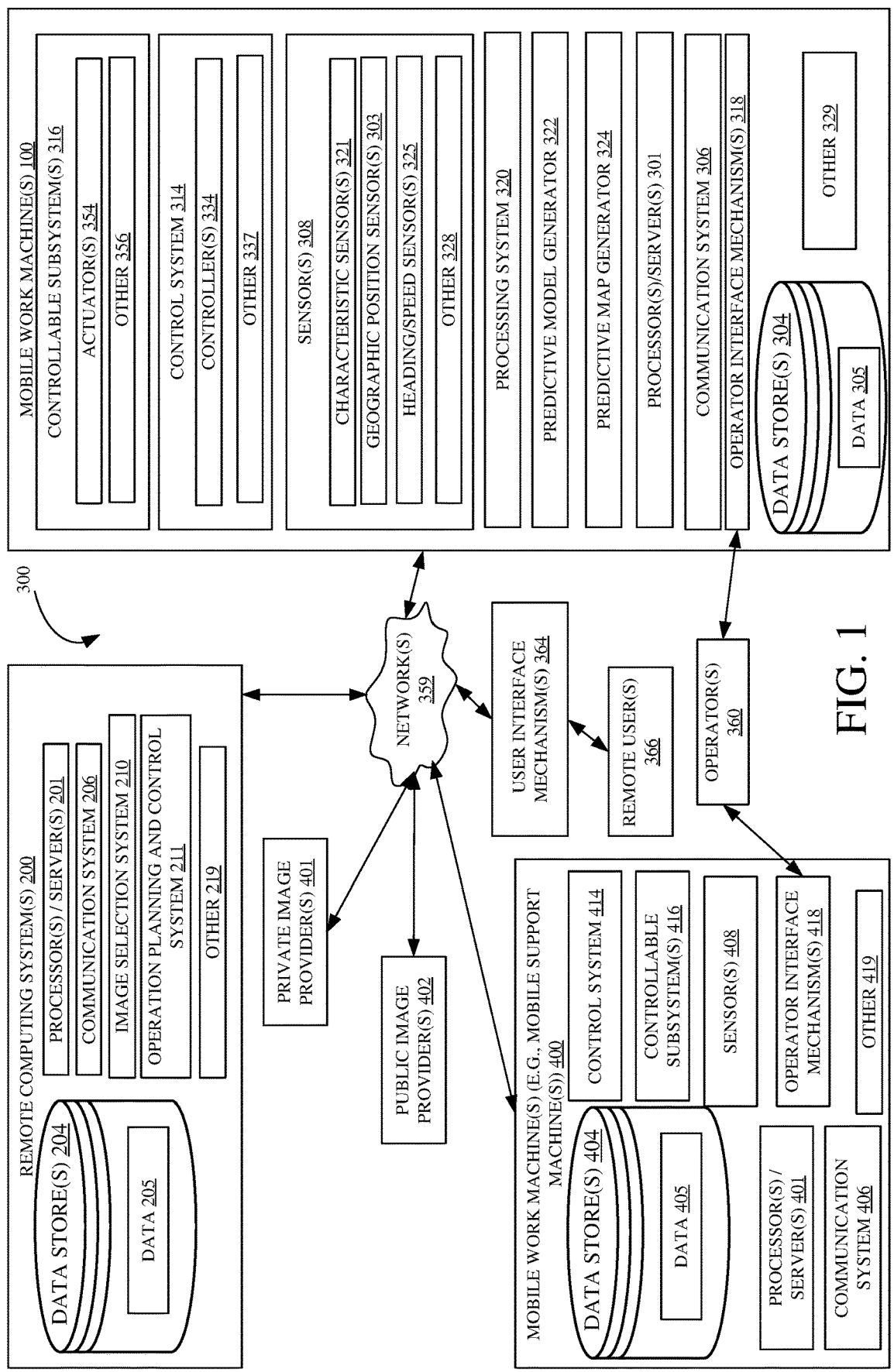
FIG. 1 is a block diagram of one example worksite operation system architecture.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In some current systems, overhead images (e.g., satellite images, etc.) of a worksite are obtained from one or more of a variety of sources (e.g., image providers). The overhead images can include or indicate values of a characteristic at different locations across worksite. Thus, the overhead images can be used to predict values of a characteristic across a worksite. The predictive values of the characteristic can be used to plan an operation or to control a mobile work machine, or both. For instance, one example of an overhead image is an overhead multispectral image. An overhead multispectral image includes (or indicates) multi-spectral values (e.g., reflectance values) across the worksite. The values can be used to predict values of a characteristic at the worksite (e.g., field), such as to predict values of crop yield (or yield). One example of overhead multispectral images are vegetation index images (e.g., Normalized Difference Vegetation Index (NDVI) images). An overhead vegetation index image includes (or indicates), as multi-spectral values, vegetation index values (e.g., NDVI values) across the worksite. The vegetation index values can be used to predict values of a characteristic at the worksite (e.g., field), such as to predict values of crop yield (or yield).

Predictive yield values can be used to plan a worksite operation, such as a harvesting operation, or can be used to control settings of one or more work machines, or both. An accurate prediction of characteristic values at a worksite is useful in planning the operation to maximize performance and is useful in controlling the settings of a work machine such that the work machine performance can be optimized (e.g., will have optimized settings at the time the work machine encounters, or is otherwise affected by, a given characteristic, or will otherwise have optimized settings to account for the given characteristic(s)).

However, there are a variety of overhead image providers. Some overhead image providers are public (e.g., freely accessible). Some overhead image providers are private (e.g., require payment). The overhead images, whether from a public or private provider, can vary in resolution, can be captured by different sensor technologies, can be captured at different times of a year, and can vary in various other ways, for instance, the number of wavelengths (or bands) imaged may vary, the resolution may vary, the timing of the image may vary, the underlying sensor technology may vary, as well as other variances. It can be difficult to know whether an overhead image will have a satisfactory image performance quality (e.g., whether the overhead image will accurately predict values of the characteristic of interest, that is, whether the overhead image will have values that correlate well with values of the characteristic of interest). Some users may default to using overhead images from private providers which can increase costs and may not be necessary (e.g., overhead images from a public provider may have sufficient performance quality). Some users may default to gathering a large number of overhead images from public providers or private providers, or both, and, test each one during the operation to see which may work best for control of a machine. Obtaining, transferring, storing, and processing a large number of images can increase costs, increase computational complexity, and can lead to processing delays.

It can be difficult and time consuming to manually determine the performance quality of overhead images. Automated systems and methods capable of selecting one or more overhead images of sufficient performance quality to provide for planning of worksite operations and control of work machines would be useful.

The present discussion proceeds, in some examples, with respect to automated systems and methods that obtain and analyze overhead images of a worksite to determine an image performance quality of each of the obtained overhead images and select one or more of the obtained overhead images for use in planning a worksite operation or controlling a work machine, or both.

It will be noted that while the various examples discussed herein proceed in the context of agricultural worksite operations and agricultural work machines, the systems and methods described herein are applicable to and can be used in various other worksite operations and with various other work machines.

FIG. 1 is a block diagram of a worksite operation system architecture 300 (also referred to herein as worksite operation system 300 or system 300). FIG. 1 shows that worksite operation system 300 includes one or more mobile work machines 100, one or more remote computing systems 200, one or more remote user interfaces 364, and one or more mobile work machines (hereinafter referred to as mobile support machines or machines) 400. Mobile work machines 100, themselves, each illustratively include one or more processors or servers 301, one or more data stores 304, a communication system 306, one or more sensors 308, a control system 314, one or more controllable subsystems 316, a processing system 320, a predictive model generator 322, a predictive map generator 324, and can include various other items and functionality 329. Remote computing systems 200, themselves, illustratively include one or more processors or servers 201, one or more data stores 204, a communication system 206, an image selection system 210, operation planning and control system 211, and can include various other items and functionality 219. Mobile support machines 400, themselves, each illustratively include one or more processors or servers 401, one or more data stores 404, communication system 406, one or more sensors 408, a control system 414, one or more controllable subsystems 416, one or more operator interface mechanisms 418, and can include various other items and functionality 419.

Data stores 204, 304, and 404 store a variety of data (generally indicated as data 205, 305, and 405 respectively), some of which will be described in more detail herein. For example, one or more of data 205, 305, and 405 can include, among other things, overhead worksite images (e.g., current overhead images or historical overhead images, or both), historical characteristic values, thresholds, worksite operation data, as well as a variety of other data. Additionally, data 205 can include computer executable instructions that are executable by one or more processors or servers 201 to implement other items or functionalities of material transfer operation system 300, including to implement other items or functionalities of remote computing systems 200. Additionally, data 305 can include computer executable instructions that are executable by one or more processors or servers 301 to implement other items or functionalities of material transfer operation system 300, including to implement other items or functionalities of work machines 100. Additionally, data 405 can include computer executable instructions that are executable by one or more processors or servers 401 to implement other items or functionalities of material transfer operation system 300. Additionally, data 405 can include computer executable instructions that are executable by one or more processors or servers 401 to implement other items or functionalities of material transfer operation system 300, including to implement other items or functionalities of machines 400. It will be understood that data stores 204, data stores 304, and data stores 404 can include different forms of data stores, for instance one or more of volatile data stores (e.g., Random Access Memory (RAM)) and non-volatile data stores (e.g., Read Only Memory (ROM), hard drives, solid state drives, etc.).

Sensors 308 can include one or more characteristic 321, one or more heading/speed sensors 325, one or more geographic position sensors 303, and can include various other sensors 328 as well.

Figure 2:
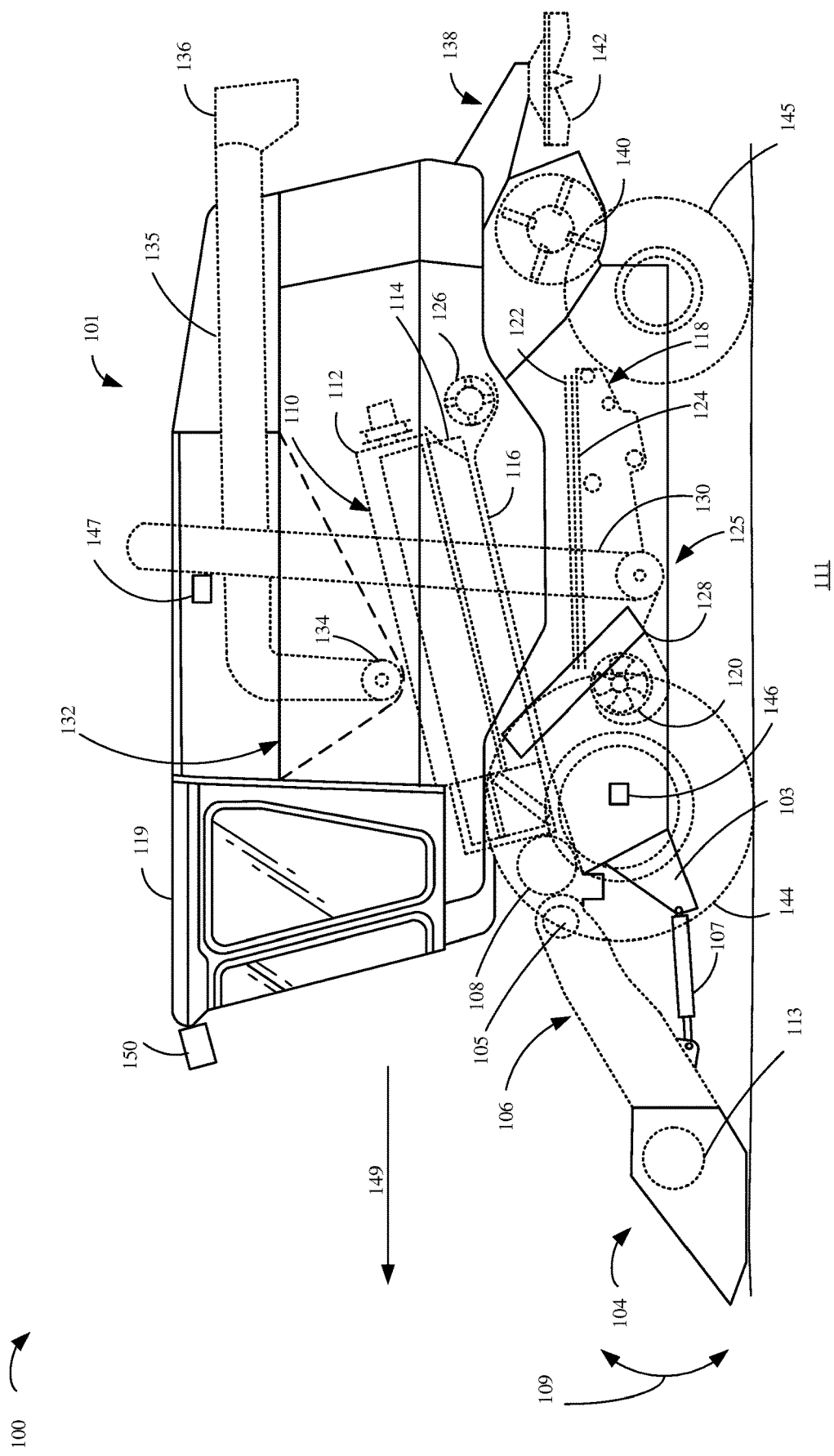
FIG. 2 is a partial pictorial, partial schematic illustration of one example mobile work machine.

Some examples of sensors 308 are shown in FIG. 2.

Characteristic sensors 321 can include one or more of a variety of sensors, such as cameras (e.g., mono or stereo cameras), multispectral imagers, lidar sensors, radar sensors, ultrasonic sensors, mass flow sensors, accelerometers, transducers, Hall effect sensors, encoders, pressure sensors, torque sensors, voltage sensors, amperage sensors, inertial measurement units (IMUs), capacitance sensors, spectrometers, impact sensors, strain gauges, as well as a variety of other sensors. Characteristic sensors 321 detect characteristics at the worksite, which includes characteristics of the worksite (e.g., characteristics of the ground/soil, characteristics of vegetation (e.g., crop, etc.) at the worksite, characteristics of the environment of the worksite, etc.) and characteristics of the work machines (e.g., operational parameters/settings and machine state).

Heading/speed sensors 325 detect a heading characteristic (e.g., travel direction) or speed characteristics (e.g., travel speed, acceleration, deceleration, etc.), or both, of a corresponding mobile work machine 100. This can include sensors that sense the movement (e.g., rotation) of ground- or movement of components coupled to the ground engaging traction elements (e.g., wheels or tracks) or other elements, or can utilize signals received from other sources, such as geographic position sensors 303. Thus, while heading/speed sensors 325 as described herein are shown as separate from geographic position sensors 303, in some examples, machine heading/speed is derived from signals received from geographic position sensors 303 and subsequent processing. In other examples, heading/speed sensors 325 are separate sensors and do not utilize signals received from other sources.

Geographic position sensors 303 illustratively sense or detect the geographic position or location of a corresponding mobile work machine 100. Geographic position sensors 303 can include, but are not limited to, a global navigation satellite system (GNSS) receiver that receives signals from a GNSS satellite transmitter. Geographic position sensors 303 can also include a real-time kinematic (RTK) component that is configured to enhance the precision of position data derived from the GNSS signal. Geographic position sensors 303 can include a dead reckoning system, a cellular triangulation system, or any of a variety of other geographic position sensors.

A mobile work machine 100 can include one or more of a variety of other sensors that detect a variety of other characteristics.

Sensors 408 can be similar to sensors 308. For example, sensors 408 can include: heading/speed sensors, similar to sensors 325, that detect a heading characteristic (e.g., travel direction) or speed characteristics (e.g., travel speed, acceleration, deceleration, etc.), or both, of a corresponding machine 400; geographic position sensors, similar to sensors 304, that sense or detect the geographic position or location of a corresponding machine 400; and characteristic sensors, similar to sensors 325, that detect characteristics at the worksite; and other sensors.

Controllable subsystems 316 can include one or more actuators 354 and can include other items 356 as well. Actuators 354 are controllable to activate or deactivate components (or functionality) of a mobile work machine 100 or to adjust operation of a mobile work machine 100 or of different components (or functionality) of a mobile work machine 100, or both. Actuators 354 can include any of a variety of different types of actuators, such as hydraulic actuators, pneumatic actuators, electrical actuators, electromechanical actuators, as well as various other actuators. Actuators 354 can include engines, motors, pumps, as well as various other mechanisms. As previously discussed, actuators 354 can be controlled to adjust operation of different components of a mobile work machine 100, such as the operating speed (e.g., speed of rotation, etc.) of different components of a mobile work machine 100, direction of movement (e.g., direction of rotation, etc.) of different components of a mobile work machine 100, position (e.g., height above ground, depth into ground, position relative to another component of the mobile work machine 100, etc.) of different components of a mobile work machine 100, orientation (e.g., roll, pitch, yaw) of different components of a mobile work machine 100, as well as various other operating parameters of different components of a mobile work machine 100. Similarly, actuators 354 can be controlled to adjust operation of a mobile work machine 100, itself, such as adjusting the travel speed of a mobile work machine 100 or adjusting a travel direction (heading) of a mobile work machine 100.

Some examples of actuators 354 and some examples of components of a mobile work machine 100 are shown in FIG. 2.

Controllable subsystems 416 can be similar to controllable subsystems 316. For example, controllable subsystems 416 can include one or more actuators, similar to actuators 354, that are controllable to activate or deactivate components (or functionality) of a machine 400 or to adjust operation of a machine or of different components (or functionality) of machine 400, or both. Such actuators can include actuators operable to adjust operation of different components of a machine 400, such as the operating speed (e.g., speed of rotation, etc.) of different components of a machine 400, direction of movement (e.g., direction of rotation, etc.), of different components of a machine 400, position (e.g., height above ground, depth into ground, position relative to another component of the machine 400, etc.) of different components of a machine 400, orientation (e.g., roll, pitch, yaw) of different components of a machine 400, as well as various other operating parameters of different components of a machine 400. Similarly, the actuators can be controlled to adjust operation of a machine 400, itself, such as adjusting the travel speed of a machine 400 or adjusting a travel direction (heading) of a machine 400.

Control system 314 can include one or more controllers 334 and can include various other items 337. Controllers 334 illustratively generate control signals to control controllable subsystems 316 as well as other items of system 300 (e.g., operator interface mechanisms 318 or user interface mechanisms 364). In one example, each subsystem 316 can have a dedicated controller 334 (e.g., each actuator 354 can have a corresponding controller 334). In another example, a controller 334 can control a plurality of the controllable subsystems 316 (e.g., one controller 334 can control a plurality of the actuators 354). Controllers 334 can generate control signals based on various data, including, as will be discussed in more detail below, based on one or more images selected by image selection system 210, based on one or more outputs 630, or based on one or more outputs 730.

Control system 414 can include one or more controllers and can include various other items. The controllers can generate control signals to control controllable subsystems 416 as well as other items of system 300 (e.g., operator interface mechanisms 418 or user interface mechanisms 364). In one example, each subsystem 416 can have a dedicated controller (e.g., each actuator of controllable subsystems 416 can have a corresponding controller). In another example, a controller can control a plurality of the controllable subsystems 416 (e.g., one controller can control a plurality of the actuators of controllable subsystems 416). The controllers of control system 414 can generate control signals based on various data, including, as will be discussed in more detail below, based on one or more images selected by image selection system 210, based on one or more outputs 630, or based on one or more outputs 730.

Processing system 320 processes data to identify values. For example, processing system 320 processes sensor data (e.g., sensor signals, etc.) generated by sensors 308 to identify values of characteristics at the worksite. Further, processing system 320 processes overhead images to identify values included in or indicated by the overhead images (e.g., reflectance values, NDVI values, etc.).

Predictive model generator 322 models a relationship (e.g., generates a model of a relationship) between values included or indicated by the overhead images and values of characteristics of the worksite. In one example, the model can be a regression model (e.g., linear regression, etc.). In other examples, the model can be another type of model, including, but not limited to, a variety of different type of machine learning (ML) models.

Predictive map generator 324 generates a predictive map of the worksite that includes (maps) a predictive value of a characteristic at each of one or more locations across the worksite based on a value, in the overhead image, at each of the one or more locations and the model generated by predictive model generator 322.

Communication system 306 is used to communicate between components of a mobile work machine 100 or with other items of system 300, such as other mobile work machines 100, remote computing systems 200, machines 400, private image providers 401, public image providers 402, and user interface mechanisms 364. Communication system 206 is used to communicate between components of a remote computing system 200 or with other items of system 300, such as other remote computing systems 200, mobile work machines 100, machines 400 private image providers 401, public image providers 402, and user interface mechanisms 364. Communication system 406 is used to communicate between components of a machine 400 or with other items of system 300, such as other machines 400, remote computing systems 200, mobile work machines 100, private image providers 401, public image providers 402, and user interface mechanisms 364.

Communication systems 206, 306, and 406 can each include one or more of wired communication circuitry and wireless communication circuitry, as well as wired and wireless communication components. In some examples, communication systems 206, 306, and 406 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks, or any combination of such systems. Communication systems 206, 306, and 406 can each also include a system that facilitates downloads or transfers of information to and from a secure digital (SD) card or a universal serial bus (USB) card, or both. Communication systems 206, 306, and 406 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks, or any combination of such networks.

FIG. 1 also shows that items of system 300 can interact with one or more private image providers 401 and with one or more public image providers 402 over networks 359. Items of system 300 can interact with private image providers 401 to obtain one or more overhead images of a worksite. Items of system 300 can interact with public image providers 402 to obtain on or more images of a worksite. Private image providers 401 can be any of a variety of private image providers that provide overhead images (e.g., satellite images) of a worksite. Private image providers 401, as previously discussed, generally require payment (e.g., payment per image or subscription, etc.) for their overhead images. Public image providers 401 can be any of a variety of public image providers that provide overhead images (e.g., satellite images) of a worksite. Overhead images from public image providers 402 are, as previously discussed, generally freely available to the public.

FIG. 1 also shows remote users 366 interacting with mobile work machines 100, remote computing systems 200, machines 400, private image providers 401, and public image providers 402 through user interfaces mechanisms 364 over networks 359. In some examples, user interface mechanisms 364 may include joysticks, levers, a steering wheel, linkages, pedals, buttons, wireless devices (e.g., mobile computing devices, etc.), dials, keypads, an interface display device actuatable elements (such as icons, buttons, etc.) on a user interface display device, a microphone and speaker (where speech recognition and speech synthesis are provided), among a wide variety of other types of control devices. Where a touch sensitive display system is provided, the users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 1 also shows that one or more operators 360 may operate mobile work machines 100, machines 400, and interact with other items of system 300, such as other mobile work machines 100, other machines 400, remote computing systems 200, private image providers 401, and public image providers 402 through operator interface mechanisms 318 or operator interface mechanisms 418. In some examples, operator interface mechanisms 318 and 418 may include joysticks, levers, a steering wheel, linkages, pedals, buttons, wireless devices (e.g., mobile computing devices, etc.), dials, keypads, an interface display device, actuatable elements (such as icons, buttons, etc.) on a interface display device, a microphone and speaker (where speech recognition and speech synthesis are provided), among a wide variety of other types of control devices. Where a touch sensitive display system is provided, the operators 360 may interact with operator interface mechanisms 318 or operator interface mechanisms 418 using touch gestures. These examples described above are provided as illustrative examples and are not intended to limit the scope of the present disclosure. Consequently, other types of operator interface mechanisms 318 and other types of operator interface mechanisms 418 may be used and are within the scope of the present disclosure.

Remote computing systems 200 can be a wide variety of different types of systems, or combinations thereof. For example, remote computing systems 200 can be in a remote server environment. Further, remote computing systems 200 can be remote computing systems, such as mobile devices, a remote network, a farm manager system, a vendor system, or a wide variety of other remote systems.

Mobile support machines 400 can be any of a wide variety of mobile support machines that operate in worksite operations, such as agricultural worksite operations. Mobile support machines 400 support the operation of mobile work machines 100 and also carry out tasks of the worksite operation. For example, in a harvesting operation, work machines 100 may include one or more harvesters and mobile support machines 400 may include material receiving machines, such as mobile grain carts or mobile grain trailers (sometimes called mobile grain trucks), or both, that receive the harvested crop (e.g., grain) harvested by the harvesters and carry and transport the harvested crop to other locations (other locations on the worksite or other locations away from the worksite, or both), such as to other support machines, storage locations, processing facilities, purchasers, as well as various other locations.

Image selection system 210, generally, obtains overhead images, analyzes the overhead images, determines performance quality for the overhead images and selects one or more of the overhead images, based on the determined performance quality, for use in controlling a mobile work machine 100. Image selection system 210 will be discussed in more detail in FIGS. 3-4.

Operation planning and control system 211, generally, generates operation planning and control outputs based on the one or more overhead images selected by image selection system 210. The operation planning and control outputs can include machine assignments, routes, machine settings, as well as other items. Operation and planning and control system 211 will be discussed in more detail in FIG. 5.

While the example shown in FIG. 1 illustrates items being distributed across worksite operation system 300 in a particular way, in other examples, one or more of the items shown in FIG. 1 can be, alternatively or additionally, located elsewhere or can be distributed across multiple locations. For example, image selection system 210 can, alternatively or additionally, be located on each of one or more mobile work machines 100. Additionally, image selection system can, alternatively or additionally, be located on each of one or more machines 400. Similarly, operation planning and control system 211 can, alternatively or additionally, be located on each of one or more mobile work machines 100 (e.g., such as part of control system 314). Similarly, operation planning and control system 211 can, alternatively or additionally, be located on each of one or more machines 400 (e.g., such as part of control system 414). Similarly, one or more of processing system 320, predictive model generator 322, and predictive map generator 324 can, alternatively or additionally, be located on each or across a plurality of remote computing systems 200. Thus, it will be understood that the items in worksite operation system 300 can be distributed in various ways, including ways that differ from the example shown in FIG. 1.

FIG. 2 is a partial pictorial, partial schematic illustration of one example mobile work machine 100. In the example shown in FIG. 2, mobile work machine 100 is in the form of an agricultural harvester 101 (illustratively a combine harvester). As illustrated in FIG. 2, harvester 101 includes ground engaging traction elements (wheels or tracks) 144 and 145 which can be driven by a propulsion subsystem (e.g., motor or engine and other drivetrain elements) to propel harvester 101 across a worksite 111 (e.g., a field). Harvester 101 includes an operator compartment or cab 119, which can include a variety of different operator interface mechanisms (e.g., 318 shown in FIG. 1) for controlling harvester 101 as well as for displaying various information. Harvester 101 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 101 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 2, agricultural harvester 101 may also include one or more actuators that operate to apply a tilt angle, a roll angle, or both to the header 104 or portions of header 104.

Agricultural harvester 101 includes a material handling subsystem 125 that includes a thresher 110 which illustratively includes a threshing element 112 (illustratively a threshing rotor) and a set of concaves 114. Further, material handling subsystem 125 also includes a separator 116. Agricultural harvester 101 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvester 101 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 2) to a variety of positions away from agricultural harvester 101 to align spout 136 relative to a material receptacle (e.g., grain cart, towed trailer, etc.) that is configured to receive the material within grain tank 132. Spout 136, in some examples, is also rotatable to adjust the direction of the material stream exiting spout 136.

Harvester 101 also includes a residue subsystem 138 that can include chopper 140 and spreader 142. Harvester 101 also includes a propulsion subsystem that includes an engine (or other form of power plant) that drives ground engaging traction components, such as 144 or 144 and 145 to propel the harvester 101 across a worksite such as a field (e.g., ground 111). In some examples, a harvester within the scope of the present disclosure may have more than one of any of the subsystems mentioned above. In some examples, harvester 101 may have left and right cleaning subsystems, separators, etc., which are not shown in FIG. 2.

In operation, and by way of overview, harvester 101 illustratively moves through a worksite (e.g., field) 111 in the direction indicated by arrow 149. As harvester 101 moves, header engages the crop plants to be harvested and cuts (with a cutter bar on the header 104, not shown in FIG. 2) the crop plants to generate cup crop material.

The cut crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by threshing element 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 101 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 101 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 101 can include a variety of sensors 308, some of which are illustrated in FIG. 2, such as ground speed sensor 146, one or more mass flow sensors 147, and one or more observation sensors 150.

Ground speed sensor 146 senses the travel speed of a work machine over the ground. Ground speed sensors 146 is one example of a heading/speed sensor 325. Ground speed sensor 146 may sense the travel speed of the work machine by sensing the speed of rotation of the ground engaging traction elements (e.g., 144 or 145, etc.), or both, a drive shaft, an axle, or other components. In some instances, the travel speed may be sensed using a positioning system (e.g., geographic position sensors 303), such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when a work machine is on a slope, the orientation of the work machine relative to the slope is known. For example, an orientation of the work machine could include ascending, descending or transversely travelling the slope.

Mass flow sensors 147 sense the mass flow of material (e.g., grain) through clean grain elevator 130. Mass flow sensors 147 may be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor. Mass flow sensors 147 are one example of characteristic sensors 321.

Observation sensors 150 can include one or more of a variety of sensors, such as cameras (e.g., mono or stereo cameras), lidar sensors, radar sensors, ultrasonic sensors, as well as a variety of other sensors. Observation sensors 150 can detect characteristics at the worksite, such as characteristics at the worksite around (e.g., ahead of, etc.) a work machine. While FIG. 2 shows some example positions of observation sensors 150, it will be understood that observation sensors 150 can be positioned (or otherwise disposed) at a variety of other locations on harvester 101. Observation sensors 150 are one example of characteristic sensors 321.

Harvester 101 can include various other sensors 308, including those discussed previously in FIG. 1.

Figure 3:
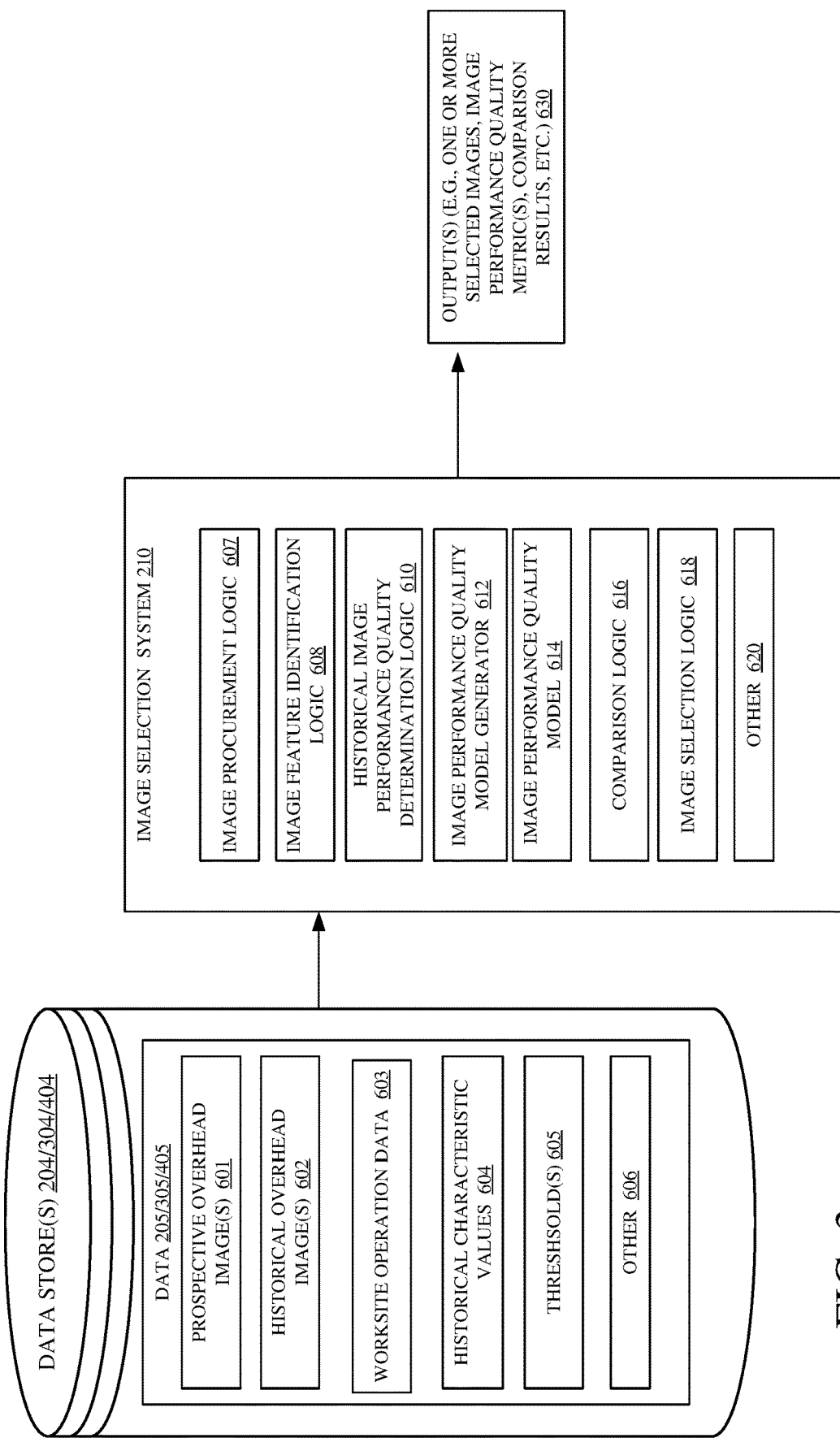
FIG. 3 is a block diagram of items of worksite operation system architecture, including an image selection system.

FIG. 3 is a block diagram of portions of worksite operation system 300, including image selection system 210, shown in FIG. 1, in more detail. FIG. 3 also shows the information flow among the various components shown. As illustrated, image selection system obtains (e.g., retrieves or receives) one or more of data 205 or 305, or both, and generates outputs 630 based thereon. The one or more outputs 630, which can include one or more selected overhead images, one or more image performance quality metrics, as well as various other items, can be provided to other items of system 300 and can be used to control various items of system 300.

Data 205, data 305, or data 405, or a combination thereof, can include prospective overhead images 601, historical overhead images 602, worksite operation data 603, historical characteristic values 604, thresholds 605, and can include various other data 606, including, but not limited to, data previously described.

Prospective overhead images 601 are images of a worksite, obtained from private image providers 401 or public image providers 402, or both. Prospective overhead images 401 are named prospective to indicate that they are candidates for use in planning and/or control of a current or upcoming operation. Prospective overhead images 601 are, generally, logically tied in time to a current or upcoming operation. For example, where a prospective overhead image 601 is to be used for planning and/or control of an agricultural worksite operation, the prospective image 601 may be taken in the same year, or the same growing season, or at least after the previous season (e.g., after completion of harvesting of the previous season).

Prospective overhead images 601 include or indicate values of a characteristic at different locations across worksite. Thus, the prospective overhead images 601 can be used to predict values of a characteristic across a worksite (e.g., the characteristic to which the values in the image correspond or a related characteristic). Predictive values of a characteristic can be used to plan an operation or to control machine settings, or both. For instance, one example of a prospective overhead image 601 is an overhead multispectral image. An overhead multispectral image includes (or indicates) values (e.g., reflectance values) across the worksite. The reflectance values can be used to predict values of a characteristic at the worksite (e.g., field), such as to predict values of crop yield (or yield). One example of overhead multispectral images are vegetation index images (e.g., Normalized Difference Vegetation Index (NDVI) images). An overhead vegetation index image includes (or indicates), as values, vegetation index values (e.g., NDVI values) across the worksite. The vegetation index values can be used to predict values of a characteristic at the worksite (e.g., field), such as to predict values of crop yield (or yield). These are merely some examples. Prospective overhead images 601 can be any of a variety of different types of images and can include or indicate any of a variety of different types of values that can be used to predict any of a variety of different types of characteristics.

Historical overhead images 602 are images of a worksite, obtained from private image providers 401 or public image providers 402, or both. Historical overhead images 401 are named historical to indicate that they are relative to a previous year, a previous season, or a previous operation. For example, a historical overhead image 602 may be an image of a field from a previous year or previous growing season and may include or indicate values of a characteristic of the field in the previous year or previous growing season.

Historical overhead images 602 include or indicate historical values of a characteristic at different locations across worksite. Thus, the historical overhead images 602 could have been used to predict values of a characteristic across a worksite (e.g., the characteristic to which the values in the image correspond or a related characteristic) for purposes of planning and/or control of historical (previous) operations. For instance, one example of a historical overhead image 602 is a historical overhead multispectral image. A historical overhead multispectral image includes (or indicates) historical values (e.g., historical reflectance values) across a worksite. The historical reflectance values could have been used to predict values of a characteristic at the worksite (e.g., field), such as to predict values of crop yield (or yield), for a historical operation. One example of historical overhead multispectral images are historical vegetation index images (e.g., Normalized Difference Vegetation Index (NDVI) images). A historical overhead vegetation index image includes (or indicates), as historical values, historical vegetation index values (e.g., historical NDVI values) across a worksite. The historical vegetation index values could have been used to predict values of a characteristic at a worksite (e.g., field), such as to predict values of crop yield (or yield), for use in planning and/or control of a previous operation. These are merely some examples. Historical overhead images 602 can be any a variety of different types of images and can include or indicate any variety of different types of values that can be used to predict any of a variety of different types of characteristics.

Worksite operation data 603 includes data relative to a worksite operation. Worksite operation data 603 can include worksite identifying information that identifies the one or more worksites at which a given operation is being or is to be performed. The worksite identifying information can include unique worksite identifiers, geographic location information for the worksites (including boundaries), as well as other information. Worksite operation data 603 can also include characteristic identifying information that identifies a characteristic of interest (e.g., a characteristic to be predicted or otherwise used in planning and/or control of a current or upcoming worksite operation). Worksite operation data 603 can also include worksite operation timing information that indicates a time at which a worksite operation is being or is to be performed, or timing information indicative of a current time. Worksite operation data 603 can also include crop information relative to the worksite operation, such as crop type information that indicates the type of crop at the worksite(s) (e.g., corn, soybeans, wheat, etc.).

Historical characteristic values 604 are measured (e.g., detected, sensed, etc.) values of a characteristic relative to a previous year, a previous season, or a previous operation. Historical characteristic values 604 can be, in some examples, referred to as historical ground truth characteristic values. In some examples, historical characteristic values 604 are values of a characteristic detected by sensors on a mobile work machine 100 during performance of a previous operation. For instance, one example of historical characteristic values 604 are historical yield values detected by sensors (e.g., mass flow sensors) on an agricultural harvester that performed a previous harvesting operation. This is merely one example of historical characteristic values 604. Historical characteristic values 604 can be historical values of any of a variety of characteristics relative to a previous year, a previous season, or a previous operation.

Thresholds 605 can include set or desired values (or levels) useable by image selection system 210. For example, thresholds 605 can include a threshold image performance quality metric value (or level) that can be used by image selection system 210 for the selection of one or more overhead images to provide as an output 630 for use in planning and/or control of a current or upcoming operation. Thresholds 605 can include a threshold number of sufficient (e.g., of sufficient image performance quality) overhead images desired for use in planning and/or control of a current or upcoming operation. Thresholds 605 can include various other set or desired values (or levels) useable by other items of system 300, such as, but not limited to, threshold characteristic values (or levels) useable by items of system 300 for control of a mobile work machine 100.

Data stores 205, 305, and 405 can include various other data 606 some examples of which have been previously discussed.

As shown in FIG. 3, image selection system 210 includes image procurement logic 607, image feature identification logic 608, historical image performance quality determination logic 610, image performance quality model generator 612, image performance quality model 614, comparison logic 616, image selection logic 618, and can include various other items or functionality 620 as well.

Image procurement logic 607 illustratively determines overhead images (prospective and historical overhead images) based on worksite operation data 603. For example, based on the worksite timing information, the worksite identifying information, and characteristic identifying information, image procurement logic 607 can determine the type and time range of prospective overhead images 601 to be collected such that the obtained prospective overhead images will be relative to the timing of the worksite operation, the characteristic of interest, and the worksite location. For example, image procurement logic 607 will obtain prospective overhead images 601 that are useful in predicting the characteristic of interest, that were collected within an acceptable time range (e.g., in the same year, or in the same season, or within some threshold amount of time, etc.) before the operation being or to be performed. Further, in some examples, image procurement logic 607 can determine the overhead images based on crop information of worksite operation data 603 such that the historical overhead images are of historical worksites having a same crop type (e.g., corn, soybean, wheat, etc.). In this way, an image performance quality model 614 may be crop type specific.

Image feature identification logic 608 illustratively analyzes overhead images and identifies image features (e.g., 650 and 651 of FIG. 4) of overhead images. Image features can include image resolution. Image features can include image source sensor technology. Image feature can include timing information, that is, the timing of when the image was taken. The timing information can indicate an actual date and time or a time relative to another time, or both. For instance, timing information may indicate the days since a previous operation, or days since a previous season. As one example, in agricultural operations, timing information may indicate the days since planting occurred at the worksite, or days since vegetative emergence, or days since some type of operation (e.g., fertilizer application, etc.), or timing relative to various other occurrences. Image features can include image value (e.g., pixel value) statistics, such as quantiles, standard deviations, mean, median, as well as other statistics. Image features can include various other features. Where the overhead image is a multi-spectral image, image features can include, as image value (e.g., reflectance values, vegetation index (e.g., NDVI) values, etc.) statistics, band statistics which include the number of bands (or wavelengths) imaged and for each band (or wavelength) imaged, quantiles for the values of each band (e.g., five quantiles for each band), a mean value for the values of each band, a median value for the values of each band, a standard deviation value for the values of each band, as well as other statistics for the values of each band. Thus, as an example, for an overhead multi-spectral image having twelve bands (twelve imaged wavelengths), there may be, for example, a total of sixty quantiles (e.g., five quantiles for each of the twelve bands), twelve mean values (e.g., one mean value for each of the twelve bands), twelve median values (e.g., one median value for each of the twelve bands), and twelve standard deviation values (e.g., one standard deviation value for each of the twelve bands). As previously mentioned, in addition to band statistics, image features of a multi-spectral overhead image can also include one or more of resolution, image source sensor technology, timing information, as well as various other image features.

In some examples, image feature identification logic 608 is an internal component or functionality of the image performance model 614, discussed below, such as when the image performance model 614, receives, as model inputs, raw images (e.g., raw prospective overhead images 601 and raw historical overhead images 602), such as in the case when image performance model 614 is (or includes) a convolutional neural network (or other machine learning, or artificial intelligence model, operable to receive, as model inputs, raw images). In such examples, the image features identified may be abstract features (e.g., abstract values (e.g., abstract vector values), abstract value statistics, etc.), that is, they are identified (or selected) by the model 614 during training, rather than being preselected or preset features. Thus, it will be understood that, in some examples (e.g., such as instances where the image features are preselected or preset), the images (601 and 602) can be preprocessed to extract the features which are then provided to the model 614, as model inputs. In other examples (e.g., such as instances whether the image features are not preselected or preset), raw images (601 and 602) may be provided to the model 614, as model inputs, and the image features can be identified and extracted by the model 614. In either case, the model 614 can be still be supervised, during training, based on the historical image performance quality metric, as described below.

Historical image performance quality determination logic 610 determines historical image performance quality metrics (e.g., 655 in FIG. 4) for historical overhead images 602 based on historical characteristic values 604. For example, for each historical overhead image 602 there may be corresponding historical characteristic values 604. The values of the historical overhead image 602 and the corresponding historical characteristic values 604 may be georeferenced. Thus, each value of a historical overhead image 602 may correspond to a historical characteristic value 604 based on the values corresponding to a same location at a worksite. Historical image performance quality determination logic 610 may then model (e.g., regression model, such as linear regression), for each historical image 602, the values of the historical image 602 and the corresponding historical characteristic values to determine a historical performance quality metric for the historical overhead image. The historical image performance quality metric may be an R-Squared value or a Root Mean Square Error (RMSE) value or a Mean Squared Error (MSE) value, or some other value. For example, the historical performance quality metric may be some scaled value (e.g., A-F, 1-10, good/bad, high/medium/low, etc.) that is based on another value, such as an R-Squared value, an RMSE value, or an MSE value. The historical image performance quality metric indicates how well the values of the historical overhead image 602 correlated to (or predicted) the corresponding historical characteristic values 604.

As an example, a historical overhead image 602 may be a historical multi-spectral image having multi-spectral values (e.g., reflectance values, vegetation index (e.g., NDVI) values, etc.). Each multi-spectral value may have a corresponding historical characteristic value 604 (e.g., a corresponding historical yield value). Historical image performance quality determination logic 610 may then model (e.g., regression model, such as linear regression) the multi-spectral values and the historical characteristic values (e.g., yield values) to determine a historical performance quality metric for historical multi-spectral image. The historical image performance quality metric for the historical multi-spectral image indicates how well the multi-spectral values (e.g., reflectance values, vegetation index (e.g., NDVI) values, etc.) of the historical multi-spectral image correlated to (or predicted) the corresponding historical characteristic values (e.g., yield values).

Image performance quality model generator 612 generates an image performance quality model 614 based on images features for historical overhead images 602 and based on historical image performance quality metrics for the historical overhead images 602. For example, the image performance quality model 614 may be a machine learning model, such as a neural network, or another type of machine learning model. This historical overhead images 602 and historical image performance quality metrics may then be the training data to generate the machine learning image performance quality model 614. During a training process, the image performance quality model generator 612 generates an in-training image performance quality model (e.g., 613 in FIG. 4) that generates an in-training model output image performance quality metric (e.g., 660 in FIG. 4) for each historical overhead image 602, of a plurality of historical overhead images 602, based on the input image features for the each historical overhead image 602, of the plurality of historical overhead images 602. The in-training image performance quality model will be trained based on the corresponding historical image performance quality metric for each historical overhead image 602, of the plurality of historical overhead images 602 until convergence (e.g., when the in-training model output image performance quality metric matches the corresponding historical image performance quality metric or when the difference between in-training model output image performance quality metric and the corresponding historical image performance quality metric stops decreasing or is within an acceptable difference range), at which point the in-training image performance quality model will be considered a trained image performance quality model 614. It will be understood that the image performance quality model 614 can continue to learn based on subsequent images (e.g., based on prospective overhead images 601 that become historical overhead images) and based on determined image quality metrics for the subsequent images (e.g., determined historical image quality metrics for the prospective overhead images 601 that become historical overhead images). In other words, the image performance quality model 614 can continue to learn (or be trained) operation after operation, season after season, or year after year.

As previously mentioned, in some examples, the image performance quality model 614 may be a crop type specific model. The operation of historical image performance quality determination logic 610 and image performance quality model generator 612 are the same as previously described, however, the input training historical overhead images and the input training historical characteristic values correspond to historical worksites having a same crop type as the crop type (e.g., corn, soybean, wheat, etc.) of the current (or upcoming) operation.

The image performance quality model 614 is configured, in one example, to receive, as inputs, image features (e.g., 651 in FIG. 4) for each prospective overhead image 601, of a plurality of prospective overhead images 601, as identified by image feature identification logic 608, and to generate a model output image performance quality metric (e.g., 665 in FIG. 4) for each prospective overhead image 601, of a plurality of prospective overhead images 601. The image performance quality model 614 is configured, in one example, to receive, as inputs, a plurality of raw prospective overhead images 601, and to generate a model output image performance quality metric (e.g., 665 in FIG. 4) for each input raw prospective overhead image of the plurality of raw prospective overhead images 601.

Comparison logic 616 then performs comparisons of the model output image performance quality metrics. For example, comparison logic 616 may compare the model output image performance quality metrics to each other to identify a ranked list of prospective overhead images 601. Additionally, or alternatively, comparison logic 616 may compare the model output image performance quality metrics to a threshold image performance quality metric value 605 (e.g., 605-1 in FIG. 4) to identify a number of sufficient prospective images 601 (e.g., the number of prospective images 601 having a model output image performance quality metric that satisfies the threshold image performance quality metric value 605).

Image selection logic 618 selects one or more prospective overhead images 601 for use in planning and/or control of a current or upcoming operation, based on the model output image performance quality metrics (and the comparisons of comparison logic 616).

For example, there may be a threshold number of sufficient images 605 (e.g., 605-2 in FIG. 4) desired for use in planning and/or control of a current or upcoming operation. As an example, the threshold number of sufficient images 605 may be three. Comparison logic 616 may determine that there are five sufficient prospective images 601, in which case, image selection logic 618 may select the three highest ranking sufficient prospective images 601. Alternatively, such as where the five sufficient prospective images 601 are all of the same ranking, image selection logic 618 may select any three or may select all five, or may select three based on some other criteria, such as file size. In another example, comparison logic 616 may determine that there are only two sufficient prospective images 601, in which case, image selection logic 618 may select the two sufficient prospective images 601 and may cause image selection system 210 to communicate with an image provider to provide an additional prospective image 601. For instance, the first set of one or more prospective overhead images 601 (e.g., 601-1 in FIG. 4) analyzed by image selection system 210 for image performance quality and selection may be obtained from one or more image providers (e.g., one or more public image providers 402). Where the first set of prospective overhead images 601 provided by the one or more image providers do not provide enough sufficient prospective images 601, then image selection system 210 may communicate (or cause communication) with one or more image providers (which may be the same one or more image providers corresponding to the first set or may be a different one or more image providers, such as private image providers 401 or a different subset of public image providers 402, or combination of private image providers 401 and public image providers 402 that differs in some way from the one or more image providers corresponding to the first set) to obtain a second set one or more prospective overhead images 601, different from the first set, (e.g., 601-2 in FIG. 4) from the one or more image providers. The number of additional prospective overhead images 601 obtained for the second set may depend on the number of identified sufficient prospective overhead images 601 of the first set and on the threshold number of sufficient images 605 desired for use in planning and/or control of a current or upcoming operation.

In some examples, it may be that there is not a threshold number of sufficient images 605 desired for use in planning and/or control of a current or upcoming operation. Rather, the operation of image selection system 210 can be to determine if any of a first set of prospective overhead images 601 obtained from one or more image providers (e.g., public image providers 402) are sufficient (e.g., relative to a image quality threshold) for use in planning and/or control of a current or upcoming operation. Where at least one overhead image of the first set of prospective overhead image 601 is sufficient for use in planning and/or control of a current or upcoming operation, image selection system 210 will select that at least one sufficient prospective overhead image 601 and provide it as an output 630. Where none of the first set of prospective overhead images 601 are sufficient for use in planning and/or control of a current or upcoming operation, image selection 210 will communicate (or cause communication) with one or more image providers (e.g., which may be the same one or more image providers corresponding to the first set or may be a different one or more image providers, such as private image providers 401 or a different subset of public image providers 402, or combination of public image providers 401 and private image providers 401 that differs in some way from the one or more image providers corresponding to the first set) to obtain a second set of one or more prospective overhead images 601 from the one or more image providers.

In some examples, it may be that there is not a threshold number of sufficient images 605 desired nor an image quality threshold. Rather, the operation of image selection system can be to select a given number (e.g., a preset number, which may be selected by an operator or user, default, or otherwise provided) of the highest-ranking overhead images of a first set of prospective overhead images 601 (as indicated by a ranked list output by comparison logic 616). Image selection logic 210 may then obtain a second set of images, different than the first set, from one or more image providers (the same one or more image providers or a different one or more image providers), and select a given number of the highest-ranking overhead images of the second set of prospective overhead images 601 (as indicated by a ranked list output by comparison logic 616). In another example, rather than a given number, image selection system 210 may select all of the images of the first set of prospective overhead images 601 and provide their rankings and/or image performance quality metrics as well and further, may select all of the images of the second set of prospective overhead images 601 and provide their rankings and/or image performance quality metrics as well. An operator or user may then select which of first set or second set, or both, to provide for planning and control or, where instance, where a second set is not yet obtained, may determine that a second set of prospective overhead images 601, different than the first set, from one or more image providers (the same or different) should be procured.

It will be understood that a second set of prospective images 601 can differ from a first set of prospective images 601 in various ways, for example, they can be from different image providers. For instance, the first set may be from public image providers 402 and the second set may be from private image providers 401. In another example, the first set may be from a first subset of public image providers 402 and the second set may be from a second subset public image providers 402, different than the first subset. In another example, the first set may be from a first combination public image providers 402 and private image providers 401 and the second set may be from a second combination of public image providers 402 and private image providers 401, different than the first set. In yet another example, the first set of images and the second set of images may be from the same image providers (e.g., same subset of public image providers, same combination of public image providers and private image providers, etc.), but the first set and second set may differ in other ways, for example, they may be from a different time range.

Thus, as can be seen, in one example, image selection system 210 is operable to initially obtain a first set of one or more prospective overhead images 601 from one or more image providers and determine image performance quality metrics for the one or more prospective overhead images 601 of the first set obtained from the one or more image providers. System 210, is further operable to select, as selected images, one or more images of the first set of one or more prospective overhead images 601 of the first set or to obtain a second set of one or more prospective overhead images 601 from one or more image providers (which may be the same one or more image providers from which the first set was obtained, or may be different), determine image performance quality metrics for the one or more prospective overhead images 601 of the second set, select, as selected images, one or more images of the second set of one or more prospective overhead images, or both (i.e. select one or more images from both the first set and the second set).

In another example, image selection system 210 is operable to initially obtain a first set of one or more prospective overhead images 601 from one or more first image providers (e.g., one or more public image providers 402) and determine image performance quality metrics for the one or more prospective overhead images 601 of the first set obtained from the one or more first image providers. System 210 is further operable to select, as selected images, one or more images of the first set of the one or more prospective overhead images 601 of the first set obtained from the one or more first image providers or to obtain a second set of one or more prospective overhead images 601 from one or more second image providers (e.g., one or more private image providers 401), select, as selected images, one or more images of the second set of one or more prospective overhead images 601 obtained from one or more second image providers (e.g., one or more private image providers 401), or both (i.e., select one or more images from both the first set and the second set).

Image selection system 210 generates one or more outputs 630. The outputs 630 can include the one or more selected images, image performance quality metrics, results of comparisons by comparison logic 616, as well as various other information. The one or more outputs 630 can be provided to and/or used in the control of one or more other items of system 300, such as one or more mobile work machines 100, remote user interfaces 364, as well as various other items.

Figure 4:
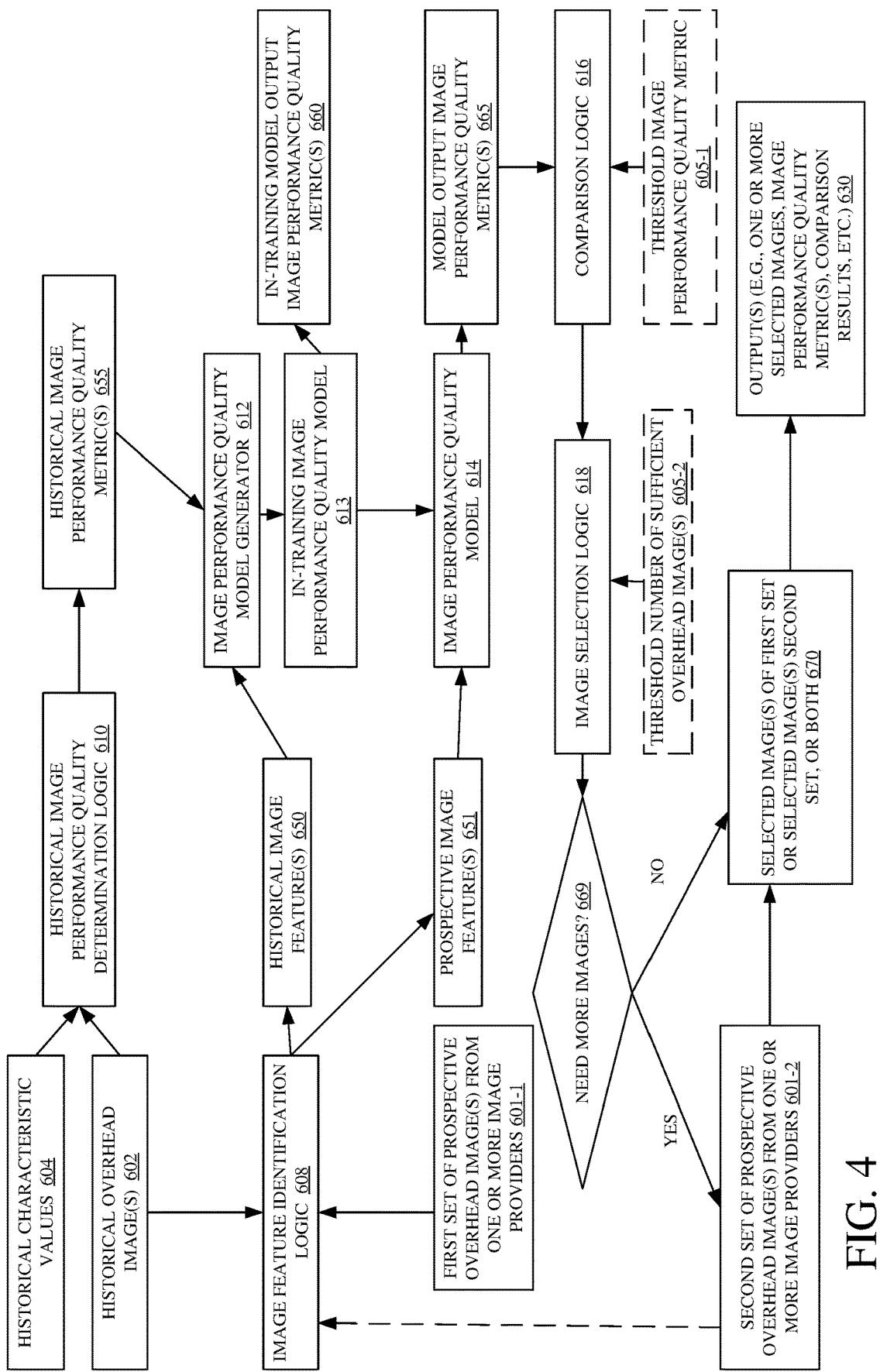
FIG. 4 is block diagram of items of worksite operation system architecture and information flow between them.

FIG. 4 is a block diagram showing some components of worksite operation system in more detail and information flow among the components. FIG. 4 shows an example of the operation of image selection system 210 from FIG. 3.

As can be seen in FIG. 4, historical image performance quality logic 610 obtains one or more historical overhead images 602 and one or more corresponding sets of historical characteristic values 604 and generates, for each of the one or more obtained historical overhead image 602, a corresponding historical image performance quality metric 650. In some examples, such as where the image performance quality model 614 is to be crop type specific, the one or more historical overhead images 602 and one or more corresponding sets of historical characteristic values 604 will be crop type specific (i.e., will correspond to historical worksites at which the same crop type was grown).

Image feature identification logic 608 identifies one or more historical image features 650 of each of the one or more obtained historical overhead images 602. In one example, the one or more historical image features 650 are provided as an input to model generator 612 which generates an in-training image performance quality model 613. The in-training image performance quality model 613 generates, for each of the one or more obtained historical images 602, an in-training model output image performance quality metric 660 based on the one or more input historical images features 650 corresponding to each of the one or more obtained historical images 602. In another example, image feature identification logic 608 is a component or functionality of the model 613, and raw historical overhead images 602 are provided to the model 613, as model inputs, and historical image features 650 (e.g., abstract image features) are identified and extracted by the model 613. The in-training model 613 generates, for each of the one or more obtained historical images 602, an in-training model output image performance quality metric 660, based on the one or more input raw historical overhead images 602 (or features thereof extracted and identified by the model 613).

The historical image performance quality metrics 650 are provided as input to the image performance quality model generator 612 to train the in-training image performance quality model 613 until convergence. That is, the historical performance image performance quality metrics 650 are used to adjust the weights and biases of the in-training image performance quality model 613 until convergence. Image performance quality model 614 is the model generated by image performance quality model generator 612 at the point of convergence.

In one example, image feature identification logic 608 identifies one or more prospective image features 651 of each overhead image of a first set of one or more prospective overhead images 601-1 obtained from one or more image providers (e.g., one or more public image providers 402, etc.). The one or more prospective image features 651 are provided as an input to image performance quality model 614. Image performance quality model 614 generates a model output image performance quality metric 665 for each prospective overhead image of the first set of one or more prospective overhead images 601-1 obtained from one or more image providers, based on the one or more input prospective images features 651 corresponding to each overhead image of the first set of one or more prospective overhead images 601-1 obtained from one or more image providers. In another example, model 614 receives, as model inputs, a first set of one or more raw prospective overhead images 601-1 obtained from one or more image providers (e.g., one or more public image providers, etc.). Image feature identification logic 608, as an internal component or functionality of model 614, identifies one or more image features 651 (e.g., abstract image features) of each input raw prospective overhead image of the first set of one or more raw prospective overhead images 601-1. Image performance quality model 614 generates a model output image performance quality metric 665 for each raw prospective overhead image of the first set of one or more raw prospective overhead images 601-1 obtained from one or more image providers, based on the one or more prospective images features 651 corresponding to each input raw prospective overhead image of the first set of one or more raw prospective overhead images 601-1 obtained from one or more image providers.

In one example, comparison logic 616 compares the model output image performance quality metrics 665 to a threshold image performance quality metric 605-1 to identify one or more sufficient overhead images of the first set of one or more prospective overhead images 601-1 obtained from one or more image providers. In some examples, comparison logic 616 can compare the model output image performance quality metrics 665 to identify a ranking (ranked list) of the first set of one or more prospective overhead images 601-1 obtained from the one or more image providers or to identify a ranking (ranked list) of the identified one or more sufficient overhead images of the one or more prospective overhead images 601-1 obtained from one or more first image providers. In some examples, a threshold image performance quality metric 605-1 is not utilized (thus, block 605-1 is represented by dashed lines), rather, comparison logic 616 can compare the model output image performance quality metrics 665 to identify a ranking (ranked list) of the first set of one or more prospective overhead images 601-1 obtained from the one or more image providers.

At block 669, image selection logic 618 then determines if more overhead images are needed. In one example, at block 669, to determine if more overhead images are needed, image selection logic 618 determines if there are enough sufficient overhead images (e.g., enough overhead images, of the first one or more prospective overhead images 601-1 obtained from one or more image providers, that satisfy the threshold image performance quality metric 605-1) based on the comparisons of comparison logic 616 and, in some examples, based on a threshold number of sufficient overhead images 605-2. This determination is represented by block 669. As previously mentioned, there may not be a threshold number of sufficient overhead images 605-2, rather, the determination may be if there are any (e.g., at least one) sufficient overhead images. Thus, block 605-2 is represented by dashed lines.

In one example, where image selection logic 618 determines that there are enough sufficient overhead images (e.g., enough to satisfy the threshold 605-2 or is at least one), image selection logic 618 selects, as one or more selected images 670, one or more sufficient overhead images of the first set of one or more prospective overhead images 601-1 obtained from one or more image providers. As previously described, image selection logic 618 may only select, as one or more selected images 670, a given number (e.g., an amount required by threshold 605-2) of the sufficient overhead images of the one or more prospective overhead images 601-1 obtained from one or more first image providers. As previously described, where there are more than enough sufficient images, image selection logic 618 may select, as selected images 670, the highest ranking sufficient images up to the given number. Additionally, as previously described, image selection logic 618 may select, as one or more selected images 670, all of the sufficient overhead images of the one or more prospective overhead images 601-1 obtained from one or more image providers.

In another example, where image selection logic 618 determines that there are not enough sufficient overhead images (e.g., not enough to satisfy the threshold 605-2 or is not at least one), image selection logic 618 will cause image selection system 210 (or some other item of system 300) to communicate with one or more image providers (e.g., the same one or more image providers corresponding to the first set of overhead images or a different one or more image providers, such as a different subset of public image providers 402, or private image providers 401, or a combination of public image providers 402 and private image providers 401 different in some way than the one or more image providers corresponding to the first set of overhead images) to obtain a second set of one or more prospective images 601-2, different than the first set 601-1 (either in source or some other facet (e.g., timing) or both). As previously discussed, the number of prospective images 601-2 obtained from the one or more image providers can depend on the number of sufficient overhead images of the first set of one or more prospective overhead images 601-1 obtained from one or more image providers. In one example, image selection logic 618 then selects, as one or more selected images 670, either the second set of one or more prospective images 601-2 obtained from one or more image providers or both the one or more sufficient overhead images of the first set of one or more prospective overhead images 601-1 obtained from one or more image providers and the second set of one or more prospective images 601-2 obtained from the one or more image providers. For example, there may be some sufficient overhead images of the first set of one or more prospective overhead images 601-1 obtained from one or more image providers but it may be that more are required (e.g., based on threshold 605-2), and thus, the selected images 670 may also include the second set of one or more prospective overhead images 601-2 obtained from one or more image providers. In some examples, image selection logic 618 may select all of the second set of one or more prospective images 601-2 (in addition to the selected images of the first set 601-1, if any) where the images of the second set 601-2 are obtained from private image providers 601.

In some examples, the second set of prospective overhead images 601-2 may be provided to image feature identification logic 608 or to model 614 as raw images (where features (e.g., abstract features) will be extracted) and from there will be processed (e.g., by image performance quality model 614 and comparison logic 616) in one of the example manners described above with regard to the first set of prospective overhead images 601-1 and image selection logic 618 will then select one or more overhead images of the second set of prospective overhead images 601-2 as selected images (in addition to the selected images of the first set 601-1, if any).

In another example, at block 669, image selection logic 618 may determine if more overhead images are needed based on a setting or based on a reference number (which may be default or operator or user selected, or provided in other ways). In such an example, a sufficiency of the images (relative to a threshold, such as 605-1) is not made. For instance, the setting may instruct that more images are to be obtained regardless of the number of overhead images of the first set of one or more overhead images 601-1. In another example, more images may need to be obtained only when the number of overhead images of the first set of one or more overhead images 601-1 does not satisfy (e.g., is less than or is less than or only equal to) the reference number. This example operation of image selection logic 618 may be utilized when, rather than determining how many, if any, overhead images of the first set of overhead images 601-1 are sufficient (e.g., relative to threshold 605-1) comparison logic 616 outputs a ranking (or ranked list) and/or the corresponding image performance quality metrics of the first set of one or more overhead images 601-1 and image selection logic 618 selects all of them, providing the rankings and/or corresponding image performance quality metrics.

In one example, at block 669, when image selection logic 618 determines that more overhead images are not needed based on the setting or the reference number, then image selection logic 618 selects, as one or more selected images 670, the first set of one or more prospective overhead images 601-1.

In one example, at block 669, when image selection logic 618 determines that more overhead images are needed based on the setting or the reference number, then image selection logic 618 will cause image selection system 210 (or some other item of system 300) to communicate with one or more image providers (e.g., the same one or more image providers corresponding to the first set of overhead images or a different one or more image providers, such as a different subset of public image providers 402, or private image providers 401, or a combination of public image providers 402 and private image providers 401 different in some way than the one or more image providers corresponding to the first set of overhead images) to obtain a second set of one or more prospective images 601-2, different than the first set 601-1 (either in source or some other facet (e.g., timing) or both). In some examples, the number of prospective images 601-2 obtained from one or more image providers can depend on the number of images of the first set 601-1 (e.g., relative to the reference number) or based on a setting. In one example, image selection logic 618 then selects, as one or more selected images 670, either the second set of one or more prospective overhead images 601-2 or both the images of the second set 601-2 and the images of the first set 601-1. In some examples, image selection logic 618 may select all of the second set of one or more prospective images 601-2 (in addition to the selected images of the first set 601-1) without further processing. In other examples, the second set of prospective overhead images 601-2 may be provided to image feature identification logic 608 or to model 614 as raw images (where features (e.g., abstract features) will be extracted) and from there will be processed (e.g., by image performance quality model 614 and comparison logic 616) in one of the example manners where a sufficiency of the images is not determined, described above with regard to the first set of prospective overhead images 601-1, and image selection logic 618 will then select the second set of prospective overhead images 601-2 as selected images (in addition to the selected images of the first set 601-1).

Image selection system 210 then provides, as outputs 630, the one or more selected images 670 and, in some examples, one or more image performance quality metrics and one or more comparison results. The outputs 630 can be provided to and used for control of one or more other items of system 300.

Figure 5:
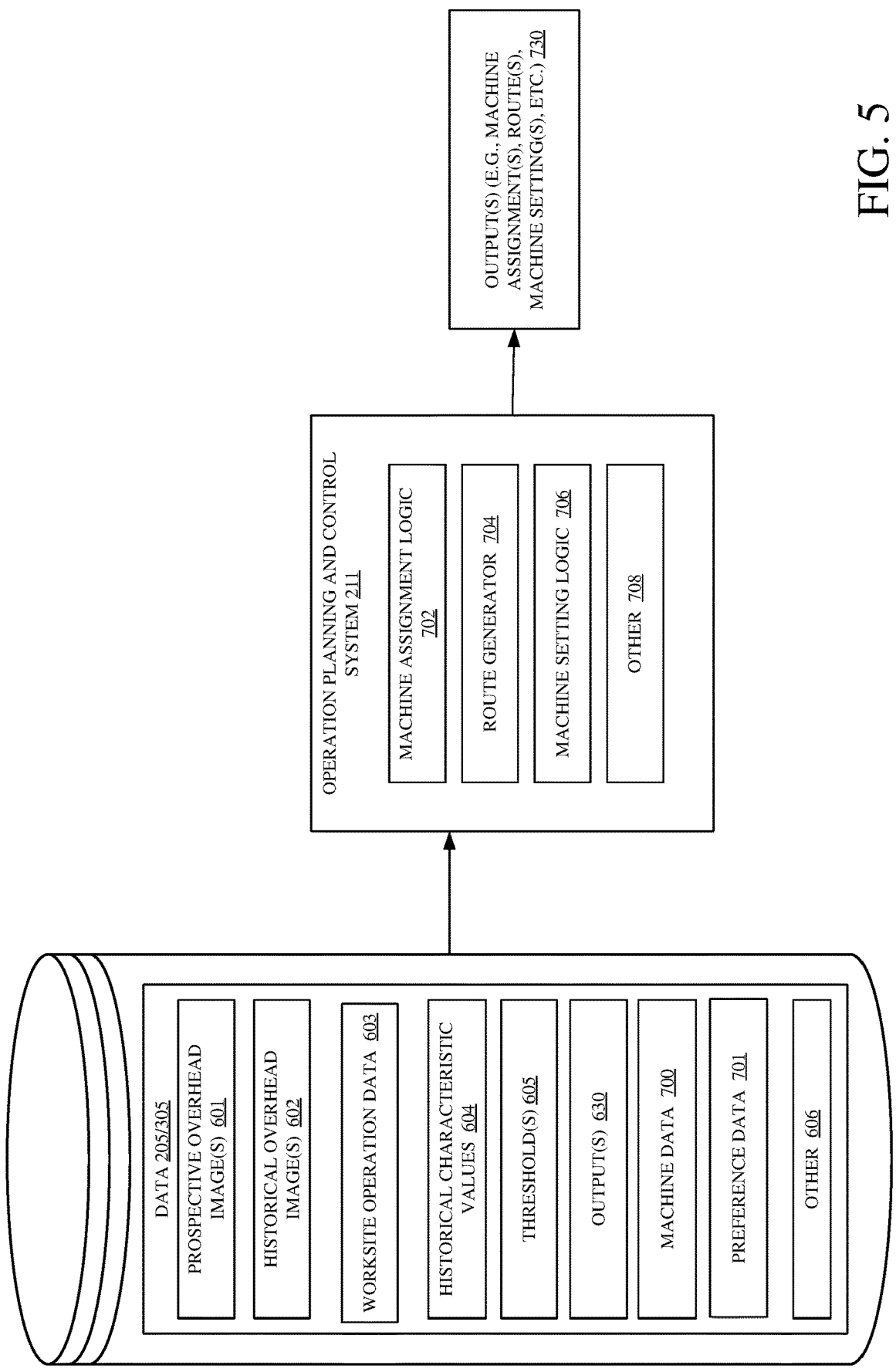
FIG. 5 is a block diagram of items of worksite operation system architecture and information flow between them.
Figure 6A:
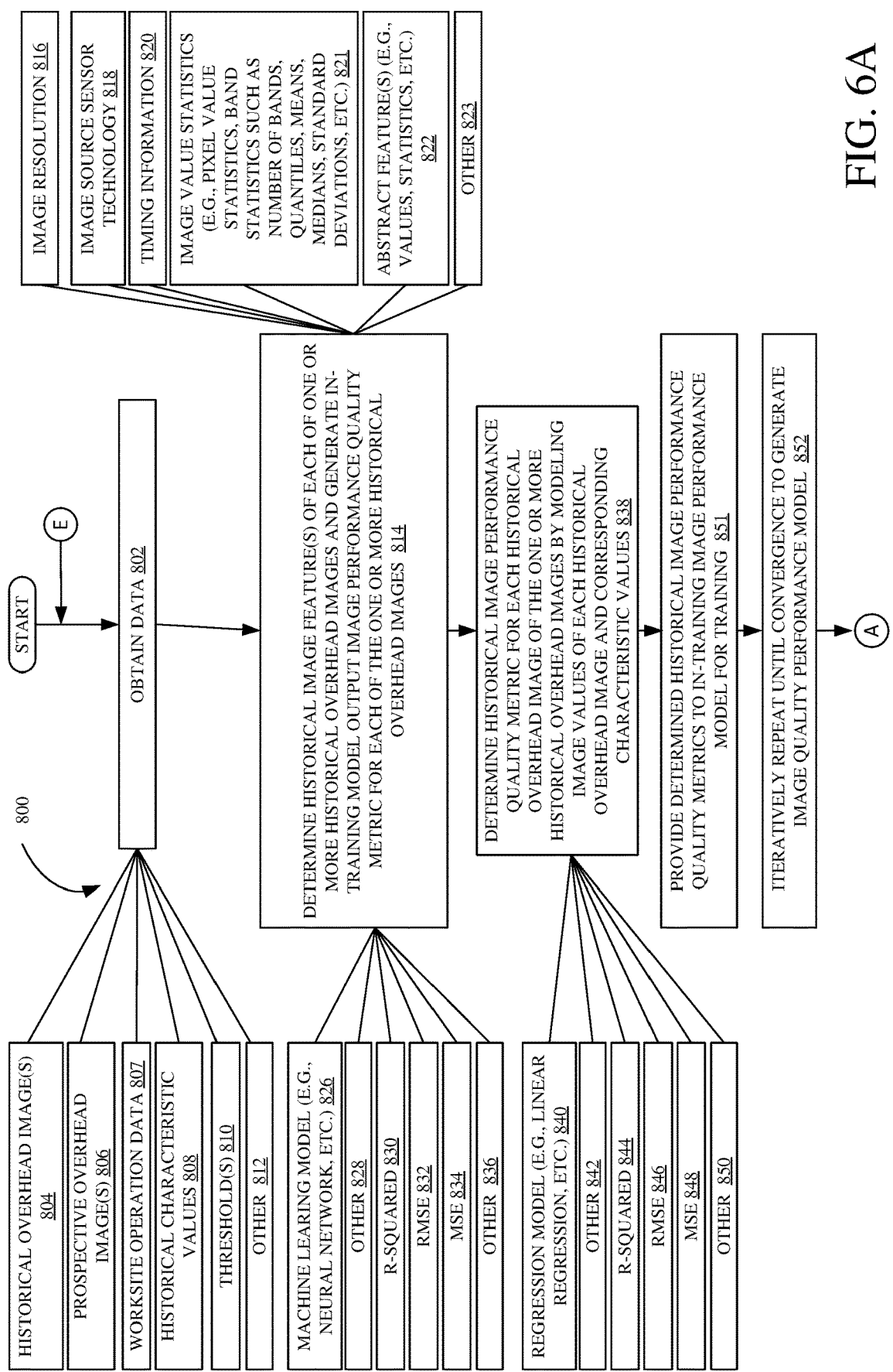
FIGS. 6A-6D (collectively referred to herein as FIG. 6) is a flow chart illustrating one example of operation of worksite operation system architecture in selecting one or more overhead images and control based thereon.
Figure 6B:
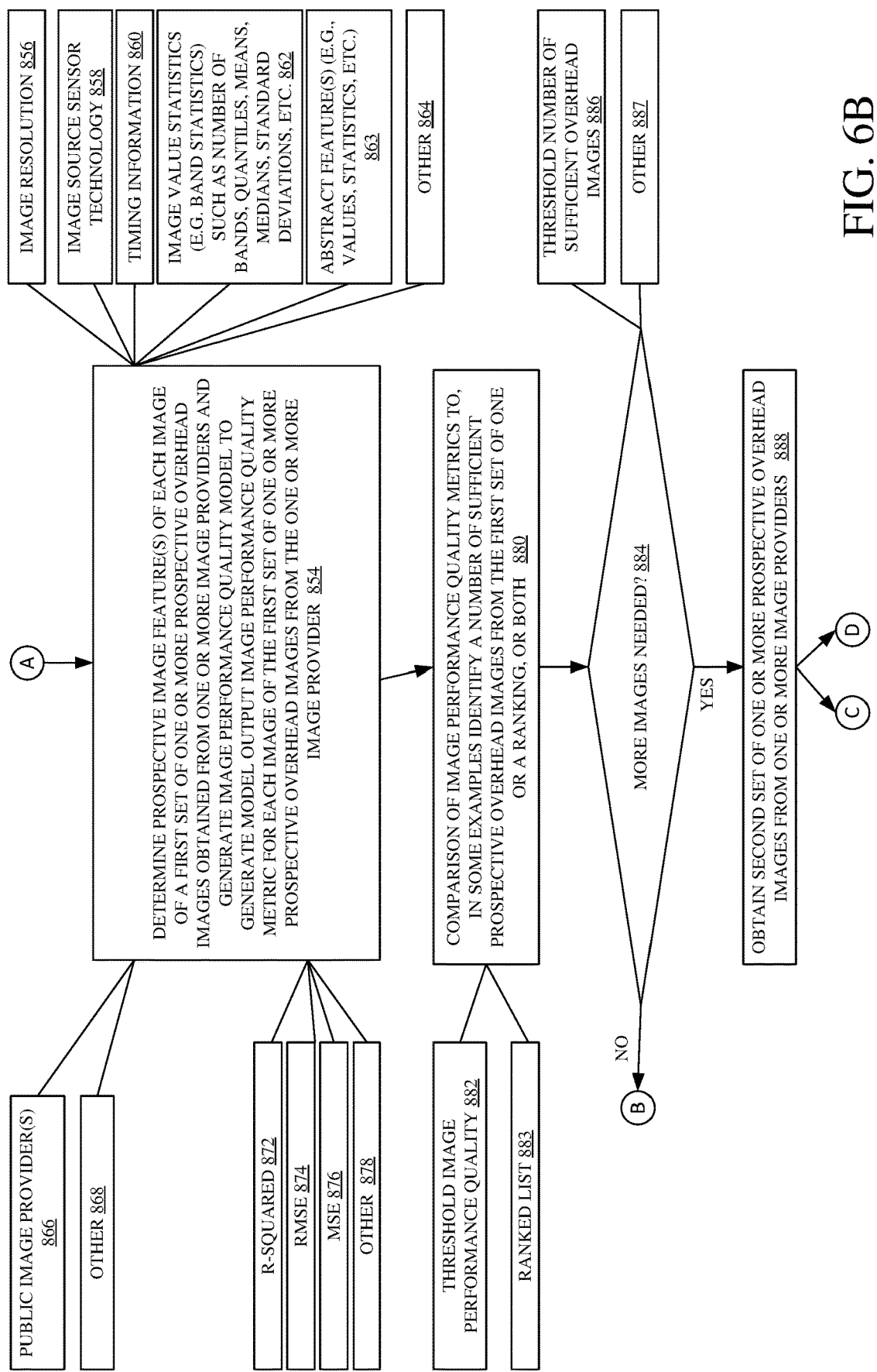
Figure 6C:
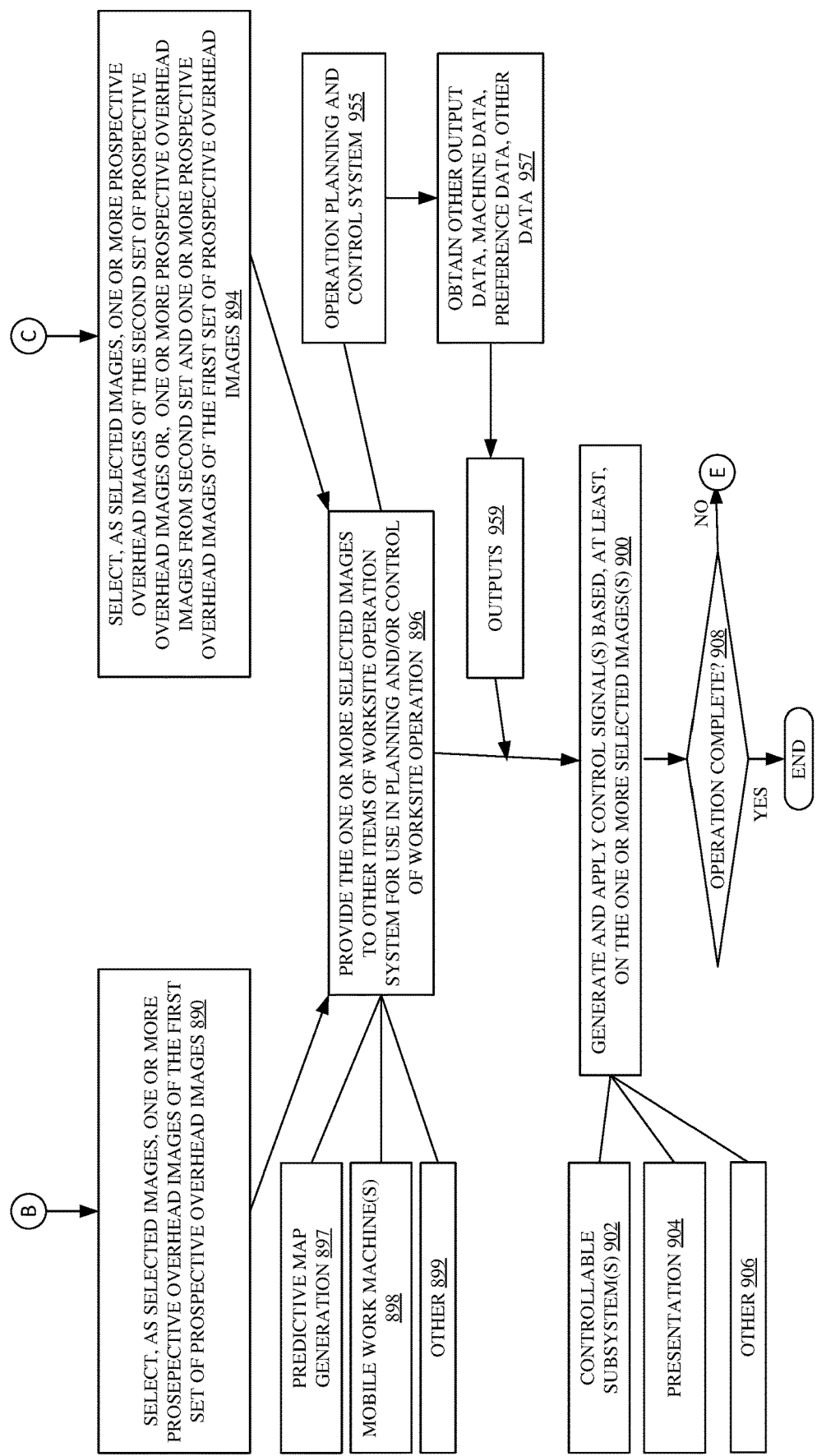
Figure 6D:
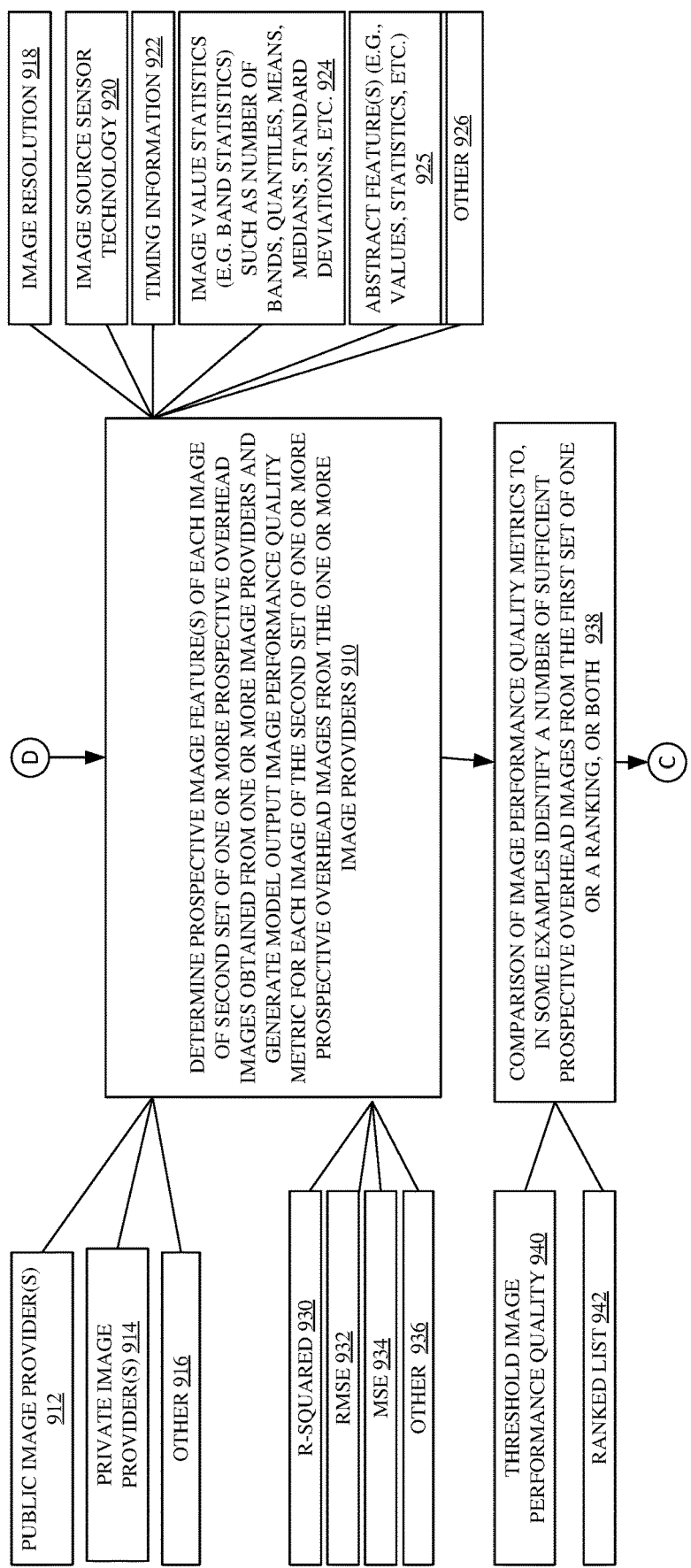

FIG. 5 is a block diagram of portions of worksite operation system 300, including operation planning and control system 211 (also referred to herein as system 211), shown in FIG. 1, in more detail. FIG. 5 also shows the information flow among the various components shown. As illustrated, system 211 obtains the one or more outputs 630 and, in some examples, other data, such as machine data 700, preference data 701, or other data 606, or a combination thereof, and generates outputs 730 based thereon. The one or more outputs 730, which can include one or more machine assignments, routes, machine settings, as well as various other items, can be provided to other items of system 300 and can be used to control various items of system 300.

As shown, data 205 or data 305, or both, can include outputs 630, machine data 700, and can include various other data 606, including but not limited to data previously described. Outputs 630 were previously described.

Machine data 700 includes identifying information and other machine characteristic information. The identifying information can include unique machine identifiers. The other machine characteristic information can include machine model/type, machine performance capabilities (e.g., machine ratings), historical machine performance data, machine dimensions, machine carrying capacity, as well as various other machine characteristic information.

Preference data 701 includes information identifying operation preferences, such as performance metric priorities. For example, the operation preferences may indicate which performance metric, of a plurality of performance metric (e.g., time to complete, grain loss, fuel efficiency, machine wear, etc.) is to be optimized or how two or more of the plurality of performance metrics are to be prioritized or balanced. The preference data 701 can be provided by operator or user input, or can be provided in other ways.

As shown in FIG. 5, operation planning and control system 211 includes machine assignment logic 702, route generator 704, machine setting logic 706, and can include various other items and functionality 708.

Machine assignment logic 702 illustratively generates machine assignments, each machine assignment assigning one or more machines 100 or one or more machines 400, or both, to one or more worksites to conduct a current or upcoming operation based on outputs 630 and, in some examples, based on one or more of machine data 700, preference data 701, and other data 606. Machine assignment logic 702 can determine where one or more machines (e.g., 100 or 400, or both) are to be assigned and can also determine the number and type of machines (e.g., 100 or 400, or both) that are to be assigned. For instance, in the example of a harvesting operation, machine assignment logic 702 can determine the number and type of harvesters (as example machines 100) that are to be assigned to the one or more worksites at which the harvesting operation is to be conducted or is currently being conducted as well as determine the number and type of support machines, such as mobile grain carts or mobile grain trailer (also called mobile grain trucks), or both, (as example machines 400), that are to be assigned to the one or more worksites at which the harvesting operation is to be conducted or is currently being conducted. The assignments generated by machine assignment logic 702 can also indicate a timing, such as a timing of when a machine should arrive at a worksite.

Route generator 704 illustratively generates machine routes, along which machines 100 will travel, based on machine assignments generated by machine assignment logic 702 and, in some examples, based on one or more of outputs 630, machine data 700, preference data 701, and other data 606. Route generator 704, additionally or alternatively, generates machine routes, along which machines 400 will travel, based on machine assignments generated by machine assignment logic 702 and, in some examples, based on one or more of outputs 630, machine data 700, preference data 701, and other data 606. The routes can include travel paths to one or more worksites or travel paths at one or more worksites, or both.

Machine setting logic 706 illustratively generates prescribed machine settings for one or more machines 100 based on machine assignments generated by machine assignment logic 702 and routes generated by route generator 704 and, in some examples, based on one or more of outputs 630, machine data 700, preference data 701, and other data 606. The machine settings for one or more machines 100 can be settings for one or more controllable subsystems 316. Machine setting logic 706, additionally or alternatively, illustratively generates prescribed machine settings for one or more machines 400 based on machine assignments generated by machine assignment logic 702 and routes generated by route generator 704 and, in some examples, based on one or more of outputs 630, machine data 700, preference data 701, and other data 606. The machine settings for one or more machines 400 can be settings for one or more controllable subsystems 416.

Operation planning and control system 211 generates one or more outputs 730. The outputs 730 can include one or more machine assignments for one or more machines 100 or for one or more machines 400, or both, one or more routes for one or more machines 100 or for one or more machines 400, or both, one or more prescribed machine settings for one or more machines 100 or for one or more machines 400, or both, as well as various other items. The one or more outputs 730 can be provided to and/or used in the control of one or more other items of system 300, such as one or more mobile work machines 100, one or more machines 400, remote user interfaces 364, as well as various other items.

FIGS. 6A-6D (collectively referred to herein as FIG. 6) show flowchart illustrating one example operation 800 of worksite operation system 300. It will be understood that operation (or portions thereof) can occur during the course of a worksite operation or prior to a worksite operation, or both.

As shown in FIG. 6, At block 802 one or more items of data are obtained (e.g., retrieved or received) by image selection system 210. As indicated by block 804, one or more historical overhead images 602 can be obtained. One or more prospective overhead images 601 can be obtained, as indicated by block 806. Worksite operation data 603 can be obtained, as indicated by block 807. Historical characteristic values 604 can be obtained, as indicated by block 808. One or more thresholds 603 can be obtained, as indicated by block 810. Various other data can also be obtained, as indicated by block 812. As previously described, in examples where the image performance quality model 614 to be generated is to be crop type specific, then the historical overhead images 602 and the historical characteristic values 604 can be crop type specific, that is, can correspond to historical worksites at which the given crop type was planted.

At block 814, image selection system 210 (e.g., image feature identification logic 608) determines one or more historical image features 650 of each of the one or more obtained historical overhead images 602. As indicated by block 816, the one or more image features can include image resolution. As indicated by block 818, the one or more image features can include image source sensor technology. As indicated by block 820, the one or more image features can include timing information. As indicated by block 821, the one or more image features can include image value statistics (e.g., pixel value statistics or band statistics) such as a number of bands, quantiles for the image values (e.g., quantiles for the pixel values or quantiles for values of each band), mean value(s) for the image values (e.g., a mean value of the pixel values or a mean value for values of each band), median value(s) for the image values (e.g., a median value of the pixel values a median value for the values of each band), standard deviation value(s) for the image values (e.g., a standard deviation value of the pixel values or a standard deviation value for the values of each band), as well as various other statistics. As indicated by block 822, the one or more image features can include abstract features, such as abstract image features (e.g., values, value statistics, etc.) identified by image performance quality model 614 (e.g., convolutional neural network, etc.) from processing raw historical overhead images 602 during training, as explained in FIG. 3. As indicated by block 823, image features can be any of a variety of other image features.

Further, at block 814, an in-training image performance quality model 613 generates, as an in-training model output, an in-training model output image performance quality metric 660 for each of the one or more historical overhead images 602, based on the one or more image features 650 of each of the one or more historical overhead images 602. As previously discussed, in some examples (e.g., examples where image features are preset or preselected), the one or more historical images 602 are pre-processed to extract the one or more image features of each historical image 602 and the one or more image features of each historical image 602 are provided as input to the in-training image performance quality model 613. In another example (e.g., examples where image features are not preset or preselected but instead are identified or selected by the model, such as by clustering algorithms, or other methods), the one or more historical images 602 are provided, in raw form, as input to the model 613 and the model 613 identifies the image features (e.g., abstract image features) for extraction based on functionality of the model. As indicated by block 826, the in-training image performance quality model 613 can be a machine learning model, such as a neural network or another type of machine learning model. As indicated by block 828, the in-training image performance quality model 613 can be another type of model. As indicated by block 830, the in-training image performance quality metric 660 can be an R-Squared value. As indicated by block 832, the in-training image performance quality metric 660 can be a Root Mean Square Error (RMSE) value. As indicated by block 834, the in-training image performance quality metric 660 can be a Mean Squared Error (MSE) value. As indicated by block 836, the in-training image performance quality metric can be other types of values, such as some scaled value (e.g., A-F, 1-10, good/bad, high/medium/low, etc.) that is based on another value, such as an R-Squared value, an RMSE value, or an MSE value. Each in-training image performance quality metric 660 is a value predictive of how well the values of the corresponding historical overhead image 602 will correlate to (or predict) the corresponding historical characteristic values 604.

At block 838, image selection system 210 (e.g., historical image performance quality determination logic 610) determines a historical image performance quality metric 655 for each historical overhead image 602 of the one or more obtained historical overhead images 602 by modeling image values (e.g., reflectance values, vegetation index (e.g., NDVI) values, etc.) of each historical overhead image 602 and corresponding historical characteristic values 604. As indicated by block 840, image selection system 210 may utilize regression modeling (e.g., linear regression, etc.) to model the image values and corresponding historical characteristic values 604. As indicated by block 842, image selection system 210 may utilize other types of modeling. As indicated by block 844, the historical image performance quality metric 655 can be an R-Squared value 844. As indicated by block 846, the historical image performance quality metric 655 can be an Root Mean Square Error (RMSE) value. As indicated by block 848, the historical image performance quality metric 655 can be a Mean Squared Error (MSE) value. As indicated by block 850, the historical image performance quality metric 655 can be other types of values, such as some scaled value (e.g., A-F, 1-10, good/bad, high/medium/low, etc.) that is based on another value, such as an R-Squared value, an RMSE value, or an MSE value. Preferably, the historical image performance quality metric 655 and the in-training image performance quality metric 660 will both be the same type of value. Each historical image performance quality metric 655 indicates how well the values of the corresponding historical overhead image 602 correlated to (or predicted) the corresponding historical characteristic values 604.

At block 851, the one or more historical image performance quality metrics 655 are provided to the in-training image performance quality model 613 to train (e.g., adjust model parameters, such as weights and biases) the in-training image performance quality model 613. At block 852, blocks 824 though blocks 851 are iteratively repeated until convergence. Convergence results in a generated image quality performance model 814.

At block 854, image selection system 210 (e.g., image feature identification logic 608) determines one or more prospective image features 651 of each overhead image of a first set of one or more prospective overhead images 601-1 obtained from one or more image providers. As previously discussed, in some example, the one or more image providers, from which the first set of one or more prospective overhead images 601-1 are obtained, may be one or more public image providers 402, as indicated by block 866. In other example, the one or more image providers corresponding to the first set 601-1 can be other types of image providers, such as private image providers 401, or a combination of private image providers 401 and public image providers 402. As indicated by block 856, the one or more image features can include image resolution. As indicated by block 858, the one or more image features can include image source sensor technology. As indicated by block 860, the one or more image features can include timing information. As indicated by block 862, the one or more image features can include image value statistics (e.g., pixel value statistics or band statistics) such as a number of bands, quantiles for the image values (e.g., quantiles for the pixel values or quantiles for values of each band), mean value(s) for the image values (e.g., a mean of the pixel values or a mean value for values of each band), median value(s) for the image values (e.g., a median of the pixel values or a median value for the values of each band), standard deviation value(s) for the image values (e.g., a standard deviation value for the pixel values or a standard deviation value for the values of each band), as well as various other statistics. As indicated by block 863, the one or more image features can include abstract features, such as abstract image features (e.g., values, value statistics, etc.) identified by image performance quality model 614 (e.g., convolutional neural network, etc.) from processing raw historical overhead images 602 during training, as explained in FIG. 3. As indicated by block 864, image features can be any of a variety of other image features. As will be understood, the image features 651 will be the same as the image features 650 used to train and thereby generate the image performance quality model 614.

Further, at block 854, the image performance quality model 614 generates, as a model output, a model output image performance quality metric 665 for each image of the first set of one or more prospective overhead images 601-1 obtained from the one or more image providers based on the one or more image features of each image of the first set of one or more prospective overhead images 601-1 obtained from the one or more image providers. As previously discussed, in some examples (e.g., examples where image features are preset or preselected), the one or more prospective images 601-1 are pre-processed to extract the one or more image features of each prospective image 601-1 and the one or more image features of the prospective images 601-1 are provided as input to the image performance quality model 614. In another example (e.g., examples where image features are not preset or preselected but instead are identified or selected by the model, such as by clustering algorithms, or other methods), the one or more prospective images 601-1 are provided, in raw form, as input to the model 614 and the model 614 identifies the image features (e.g., abstract image features) for extraction based on functionality of the model. As indicated by block 872, image performance quality metric 665 can be an R-Squared value. As indicated by block 874, the image performance quality metric 665 can be a Root Mean Square Error (RMSE) value. As indicated by block 876, the image performance quality metric 665 can be a Mean Squared Error (MSE) value. As indicated by block 878, the image performance quality metric 665 can be other types of values, such as some scaled value (e.g., A-F, 1-10, good/bad, high/medium/low, etc.) that is based on another value, such as an R-Squared value, an RMSE value, or an MSE value. Preferably, the image performance quality metric 665 will be the same type of value as the historical image performance quality metric 655 and the in-training image performance quality metric 660. Each image performance quality metric 665 is a value predictive of how well the values of the corresponding prospective overhead image of the first set 601-1 obtained from the one or more image providers will correlate to (or predict) values of a characteristic of interest (e.g., yield, or various other characteristics).

At block 880, image selection system 210 (e.g., comparison logic 616) performs comparisons based on the one or more image performance quality metrics 665 to, in some examples, identify a number of sufficient prospective overhead images of the first set 601-1 obtained from the one or more image providers or to identify a ranking, or both. For example, as indicated by block 882, image selection system 210 can compare each image performance quality metric 665 to a threshold image performance quality metric 605-1 to identify the number of sufficient prospective overhead images of the first set of images 601-1 obtained from the one or more image providers. A sufficient prospective overhead image is thus a prospective overhead image having a corresponding image performance quality metric 665 that satisfies the threshold image performance quality metric 605-1. In one example, additionally, as indicated by block 883, image selection system 210, can compare the image performance quality metrics 665 of the identified one or more sufficient prospective overhead images of the first set 601-1 obtained from one or more image providers to identify a ranked list of the identified one or more sufficient prospective overhead images of the first set 601-1 obtained from one or more image providers. In an alternative example (where a sufficiency of the images is not determined), also represented by block 883, image selection system 210 can compare the image performance quality metrics 665 of overhead images of the first set 601-1 obtained from one or more image providers to identify a ranked list of the overhead images of the first set 601-1.

At block 884, image selection system 210 (e.g., image selection logic 618) determines if more overhead images are needed. In one example, in determining whether more overhead images are need, image selection system 210 determines if there are enough sufficient prospective overhead images of the first set 601-1 obtained from the one or more image providers based on the identified number of sufficient prospective overhead images of the first set 601-1 obtained from the one or more image providers. As indicated by block 884, image selection system 210 can determine if there are enough sufficient overhead images based on a threshold number of sufficient overhead images 605-2. As indicated by block 885, image selection system 210 can determine if there are enough sufficient overhead images in other ways, as indicated by block 887, for example, it may be enough if there is at least one sufficient overhead image. In another example, as indicated by block 887 (where a sufficiency of the images is not determined), image selection system 210 determines whether more images are needed based on a setting or based on a reference number (which may be default or operator or user selected, or provided in other ways).

If, at block 884, it is determined that no more overhead images are needed, processing proceeds to block 890.

In one example, at block 890, image selection system 210 (e.g., image selection logic 618) selects, as one or more selected images 670, one or more sufficient prospective overhead images of the first set 601-1 obtained from the one or more image providers. This can include selecting a given number (e.g., the number required by threshold 605-2) of the one or more sufficient prospective overhead images 601-1 obtained from the one or more first image providers or selecting all of the sufficient prospective overhead images 601-1 obtained from the one or more first image providers, or some other quantity. In another example (where a sufficiency is not determined), at block 890, image selection system 210 selects, as one or more selected images 670, all the overhead images of the first set 601-1 or an amount of the highest ranking relative to a reference number or some other number which may be determined by a setting. In both examples, the rankings and/or image performance quality metrics 665 can also be provided.

If, at block 884, it is determined that more overhead images, processing proceeds to block 888.

At block 88, image selection system 210 (e.g., image procurement logic 607) obtains a second set of one or more prospective overhead images 601-2, different than the first set 601-1, from one or more image providers. As previously discussed, the one or more image providers corresponding to the second set 601-2 may be different than or the same as the one or more image providers corresponding to the first set 601-1. For instance, the one or more image providers corresponding to the first set 601-1 may be public image providers 402 and the one or more image providers corresponding to the second set 601-2 may be private image providers 401. In another example, the one or more image providers corresponding to the first set 601-1 may be a first subset of public image providers 402 and the one or more image providers corresponding to the second set 601-2 may be a second subset of public image providers 402, different than the first subset. In another example, the one or more image providers corresponding to the first set 601-1 may be public image providers 402 and the one or more image providers corresponding to the second set 601-2 may be a combination of a public image providers 402 (same or different than the one or more image providers corresponding to the first set 601-1) and private image providers 401. In another example, the one or more image providers corresponding to the first set 601-1 may the same as the one or more image providers corresponding to the second set 601, but the images of the first set 601-1 and the images of the second set 601-2 may be different in one or more ways, such as from different time ranges. Even where the first set 601-1 and second set 601-2 are from different providers, the images of the first set 601-1 and the images of the second set 601-2 may also be different in various other ways, such as from different time ranges. Additionally, as previously discussed, the number of prospective overhead images of the second set 601-2 obtained from one or more image providers can depend on the number of prospective overhead images of the first set 601-1 (e.g., sufficient images where sufficiency is determined, or the general number without consideration of sufficiency) obtained from the one or more image providers and, in some examples a required number of sufficient overhead images (e.g., as required by threshold 605-1 or another value, such as, at least one, or a reference number, or a setting). In one example, from block 888, processing proceeds to block 894. In another example, from block 892, processing proceeds to block 910.

At block 910, image selection system 210 (e.g., image feature identification logic 608) determines one or more prospective image features 651 of each overhead image of the second set of one or more prospective overhead images 601-2 obtained from one or more image providers. As previously discussed, in some example, the one or more image providers, from which the second set of one or more prospective overhead images 601-2 are obtained, may be one or more public image providers 402 (the same or different as the one or more image providers corresponding to the first set 601-1), as indicated by block 912. As indicated by block 914, the one or more image providers corresponding to the second set 601-2 may be private image providers (the same or different as the one or more image providers corresponding to the first set 601-1). As indicated by block 916, the one or more image providers corresponding to the second set 601-2 may be a combination of private image providers 401 and public image providers 402 (a same combination or different combination than the one or more image providers corresponding to the first set 601-1).

As indicated by block 918, the one or more image features can include image resolution. As indicated by block 920, the one or more image features can include image source sensor technology. As indicated by block 922, the one or more image features can include timing information. As indicated by block 924, the one or more image features can include image value statistics (e.g., pixel value statistics or band statistics) such as a number of bands, quantiles for the image values (e.g., quantiles for the pixel values or quantiles for values of each band), mean value(s) for the image values (e.g., a mean of the pixel values or a mean value for values of each band), median value(s) for the image values (e.g., a median of the pixel values or a median value for the values of each band), standard deviation value(s) for the image values (e.g., a standard deviation value for the pixel values or a standard deviation value for the values of each band), as well as various other statistics. As indicated by block 925, the one or more image features can include abstract features, such as abstract image features (e.g., values, value statistics, etc.) identified by image performance quality model 614 (e.g., convolutional neural network, etc.) from processing raw historical overhead images 602 during training, as explained in FIG. 3. As indicated by block 926, image features can be any of a variety of other image features. As will be understood, the image features 651 will be the same as the image features 650 used to train and thereby generate the image performance quality model 614.

Further, at block 928, the image performance quality model 614 generates, as a model output, a model output image performance quality metric 665 for each image of the second set of one or more prospective overhead images 601-2 obtained from one or more image providers based on the one or more image features of each image of the second set of one or more prospective overhead images 601-2 obtained from one or more image providers. As previously discussed, in some examples (e.g., examples where image features are preset or preselected), the one or more prospective images 601-2 are pre-processed to extract the one or more image features of each prospective image 601-2 and the one or more image features of prospective images 601-2 are provided as input to the image performance quality model 614. In another example (e.g., examples where image features are not preset or preselected but instead are identified or selected by the model, such as by clustering algorithms, or other methods), the one or more prospective images 601-2 are provided, in raw form, as input to the model 614 and the model 614 identifies the image features (e.g., abstract image features) for extraction based on functionality of the model. As indicated by block 930, image performance quality metric 665 can be an R-Squared value. As indicated by block 932, the image performance quality metric 665 can be a Root Mean Square Error (RMSE) value. As indicated by block 934, the image performance quality metric 665 can be a Mean Squared Error (MSE) value. As indicated by block 936, the image performance quality metric 665 can be other types of values, such as some scaled value (e.g., A-F, 1-10, good/bad, high/medium/low, etc.) that is based on another value, such as an R-Squared value, an RMSE value, or an MSE value. Preferably, the image performance quality metric 665 will be the same type of value as the historical image performance quality metric 655 and the in-training image performance quality metric 660. Each image performance quality metric 665 is a value predictive of how well the values of the corresponding prospective overhead image of the second set 601-2 obtained from the one or more image providers will correlate to (or predict) values of a characteristic of interest (e.g., yield, or various other characteristics).

At block 938, image selection system 210 (e.g., comparison logic 616) performs comparisons based on the one or more image performance quality metrics 665 to, in some examples, identify a number of sufficient prospective overhead images of the second set 601-2 obtained from the one or more image providers or to identify a ranking, or both. For example, as indicated by block 940, image selection system 210 can compare each image performance quality metric 665 to a threshold image performance quality metric 605-1 to identify the number of sufficient prospective overhead images of the second set of images 601-2 obtained from the one or more image providers. A sufficient prospective overhead image is thus a prospective overhead image having a corresponding image performance quality metric 665 that satisfies the threshold image performance quality metric 605-1. In one example, additionally, as indicated by block 942, image selection system 210, can compare the image performance quality metrics 665 of the identified one or more sufficient prospective overhead images of the second set 601-2 obtained from one or more image providers to identify a ranked list of the identified one or more sufficient prospective overhead images of the second set 601-2 obtained from one or more image providers. In an alternative example (where a sufficiency of the images is not determined), also represented by block 942, image selection system 210 can compare the image performance quality metrics 665 of overhead images of the first set 601-1 obtained from one or more image providers to identify a ranked list of the overhead images of the second set 601-1.

Processing then proceeds to block 894.

At block 894, image selection system 210 (e.g., image selection logic 618) selects, as one or more selected images 670, one or more prospective overhead images of the second set 601-2 (sufficient images, or all images o the second set 601-2, or some other number of the images of the second set 601-2) obtained from the one or more image providers or, in some examples, one or more prospective overhead images of the second set 601-2 (sufficient images, or all images o the second set 601-2, or some other number of the images of the second set 601-2) obtained from the one or more image providers and one or more prospective overhead images of the first set 601—obtained from the one or more image providers (e.g., one or more sufficient prospective images of the first set 601-1, or all of the images of the first set 601-1, or some other number of the images of the first set 601-1). As previously discussed, in some examples, a combination of prospective overhead images of the first set 601-1 and prospective overhead images of the second 601-2 can be selected where at least one prospective overhead image 601-1 is selected. Utilizing a combination can reduce cost, can simplify (or speed up processing), reduce data storage requirements, as well as provide other benefits.

Whether proceeding from block 890 or 894, the one or more selected images 670 are provided to one or more other items of worksite operation system 300. As indicated by block 897, the one or more selected images 670 can be provided to one or more items (e.g., predictive model generator 322 and predictive map generator 324) of worksite operation system 300 for generation of a predictive map, such as a predictive map generated by predictive map generator 324 (as discussed in FIG. 1) or another type of predictive map. As indicated by block 898, the one or more selected images 670 can be provided to one or more mobile work machines 100 and can be utilized by the one or more mobile work machine 100 for control. In examples where the predictive map generation functionality is located on a mobile work machine 100 (such as in the example shown in FIG. 1) the one or more selected images 670 can be provided to the mobile work machine 100 for purposes of predictive map generation. It will be understood that a predictive map need not be generated. Instead, the values of each of the one or more selected images 670 can be used directly for control. In addition or as an alternative to blocks 897 or block 898, or both, the one or more selected images 670 can be provided to operation planning and control system 211. as indicated by block 955. Additionally, as indicated by block 957, other information of outputs 630 can be obtained, machine data 700 data can be obtained, preference data 701 can be obtained, and other data 606 can be obtained. Based on the selected images 670, and one or more of other information of outputs 630, machine data 700, preference data 701, and other data 606, operation planning and control system 211 can generate outputs 730 which can include one or more of one or more machine assignments, one or more machine routes, one or more machine settings, and one or more other items. As indicated by block 899, the one or more selected images 670 can be provided to various other items of worksite operation system 300 including, but not limited to, remote user interface mechanisms 364.

At block 900, one or more control signals are generated and applied (e.g., by control system(s) 314, control system(s) 414 etc.), based, at least, on the one or more selected images 670. It will be understood that the one or more control signals can be generated and applied based, additionally, on other data, such as one or more of one or more other items (e.g., image performance quality metrics, and comparison results, etc.) of outputs 630, and one or more items of outputs 730.

As indicated by block 902, one or more control signals can be generated and applied to control one or more controllable subsystems 316 (e.g., actuators 354) to activate or deactivate components (or functionality) of one or more mobile work machines 100 or to adjust operation of one or more mobile work machines 100 or of different components (or functionality) of one or more mobile work machines 100, or both. Examples of such control were previously discussed in FIG. 1. Additionally, or alternatively, at block 902, one or more control signals can be generated and applied to control one or more controllable subsystem 416 (e.g., actuators) to activate or deactivate components (or functionality) of one or more machines 400 or to adjust operation of one or more machines 400 or of different components (or functionality) of one or more machines 400, or both.

As indicated by block 904, one or more control signals can be generated and applied to cause presentation (e.g. display, audible output, etc.) of or based on the one or more selected images 670 via one or more interface mechanisms (e.g., via interface mechanisms 318, 418, or 364, or a combination thereof). Additionally, one or more control signals can be generated and applied to cause presentation (e.g., display, audible output, etc.) of or based on one or more other items of outputs 630 or based on one or more items of outputs 730, or both.

As indicated by block 906, one or more control signals can be generated to control various other items of worksite operation system 300.

At block 908 it is determined if the operation at the worksite is complete. If it is determined that the operation at the worksite is not yet complete, then operation 800 returns to block 802. If it is determined that the operation at the worksite is complete, then operation 800 ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, generators, models, logic, controllers, components, and interactions. It will be appreciated that any or all of such systems, generators, models, logic, controllers, components, and interactions may be implemented by hardware items, such as one or more processors, one or more processors executing computer executable instructions stored in memory, memory, or other processing components, some of which are described below, that perform the functions associated with those systems, generators, models, logic, controllers, components, or interactions. In addition, any or all of the systems, generators, models, logic, controllers, components, and interactions may be implemented by software that is loaded into a memory and is subsequently executed by one or more processors or one or more servers or other computing component(s), as described below. Any or all of the systems, generators, models, logic, controllers, components, and interactions may also be implemented by different combinations of hardware, software, firmware, etc., some examples of which are described below. These are some examples of different structures that may be used to implement any or all of the systems, generators, models, logic, controllers, components, and interactions described above. Other structures may be used as well.

Figure 7:
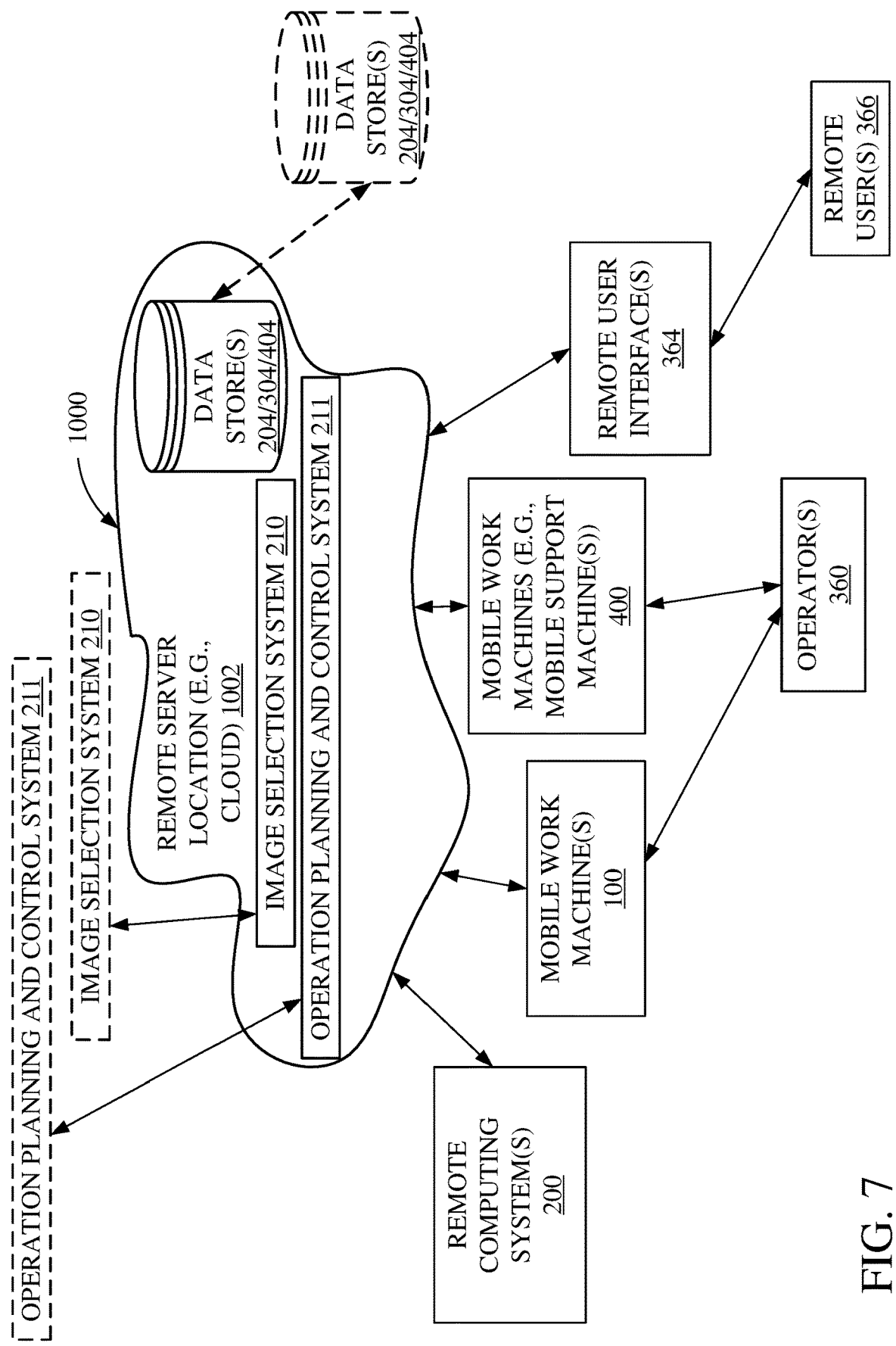
FIG. 7 is a block diagram showing one example of items of a worksite operation system architecture in communication with a remote server architecture.

FIG. 7 is a block diagram of a remote server architecture 1000. FIG. 7, also shows one or more mobile machines 100, one or more remote computing systems 200, one or more mobile support machines 400, and one or more remote user interface mechanisms 364 in communication with the remote server environment. The mobile work machines 100, remote computing systems 200, one or more mobile support machines 400, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 7, some items are similar to those shown in previous figures and those items are similarly numbered. FIG. 7 specifically shows that image selection system 210, operation planning and control system 211, and one or more of data stores 204, 304, and 404, may be located at a server location 1002 that is remote from the mobile work machines 100, remote computing systems 200, one or more mobile support machines 400, and remote user interface mechanisms 364. Therefore, in the example shown in FIG. 7, mobile work machines 100, remote computing systems 200, one or more mobile support machines 400, and remote user interface mechanisms 364 access systems through remote server location 1002. In other examples, various other items may also be located at server location 1002, such as various other items of worksite operation system architecture 300.

FIG. 7 also depicts another example of a remote server architecture. FIG. 7 shows that some elements of previous figures may be disposed at a remote server location (e.g., cloud) while others may be located elsewhere. By way of example, one or more of data store(s) 204, 304, and 404 may be disposed at a location separate from location 1002 and accessed via the remote server at location 1002. Similarly, image selection system 210 may be disposed at a location separate from locations 1002 and accessed via the remote server at locations 1002. Similarly, operation planning and control system 211 may be disposed at a location separate from locations 1002 and accessed via the remote server at locations 1002. Regardless of where the elements are located, the elements can be accessed directly by mobile work machines 100, remote computing systems 200, one or more mobile support machines 400, and remote user interface mechanisms 364 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e.g., mobile work machine 100, mobile support machine 400) comes close to the machine containing the information collection system, such as a fuel truck prior to fueling, the information collection system collects the information from the mobile machine using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on a mobile machine until the mobile machine enters an area having wireless communication coverage. The mobile machine, itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 8:
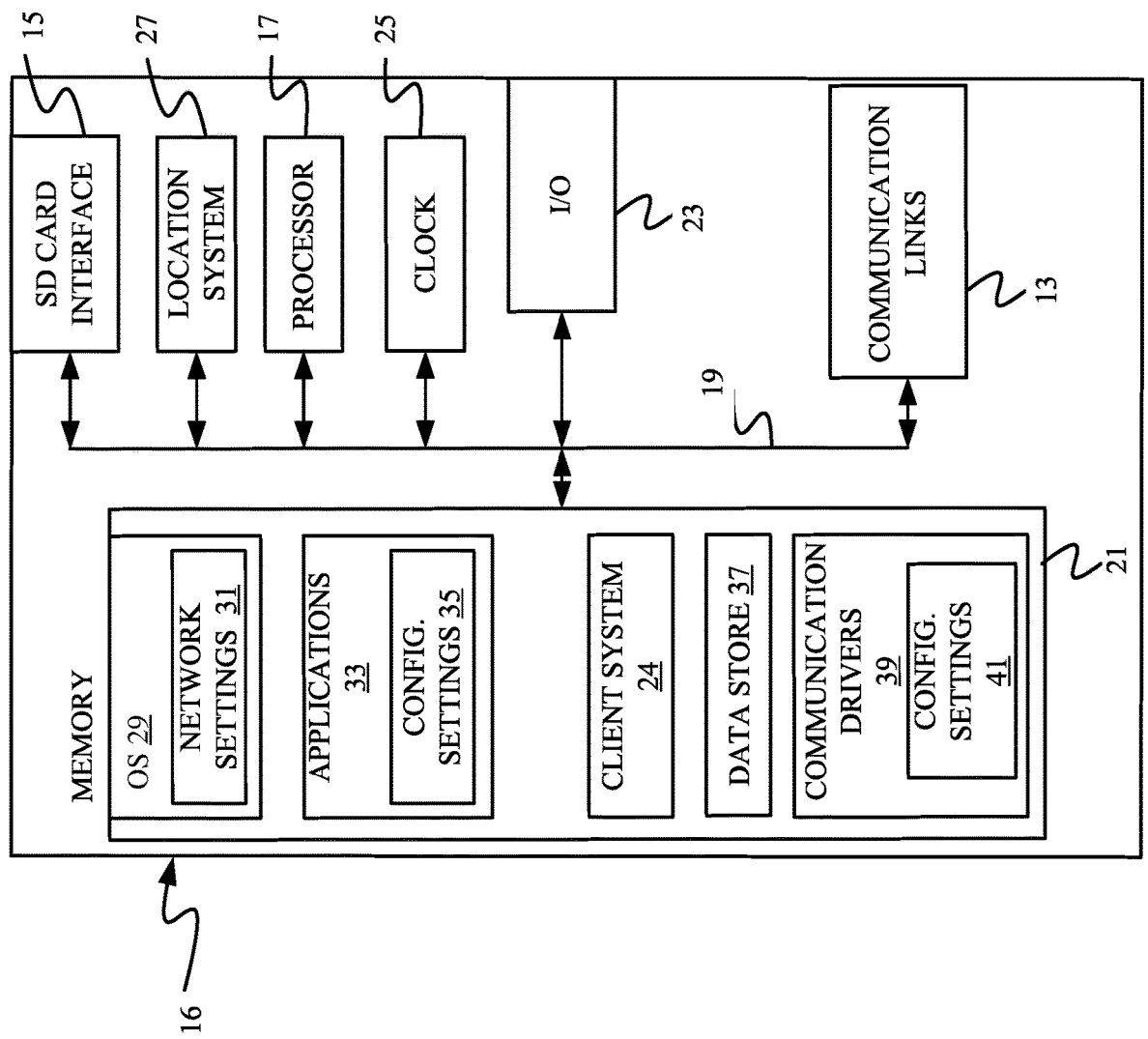
FIGS. 8-10 show examples of mobile devices that can be used in a worksite operation system architecture.
Figure 9:
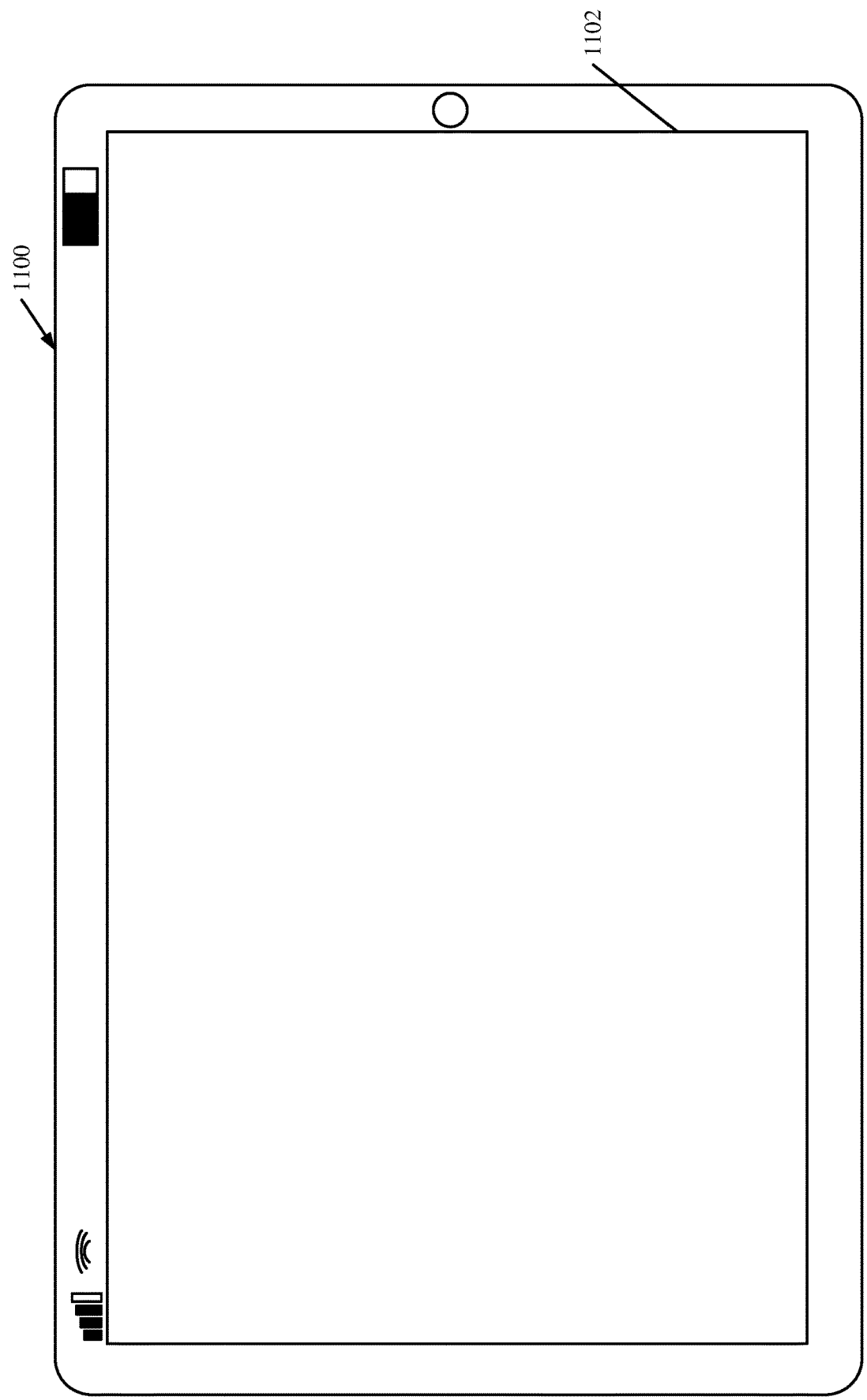
Figure 10:
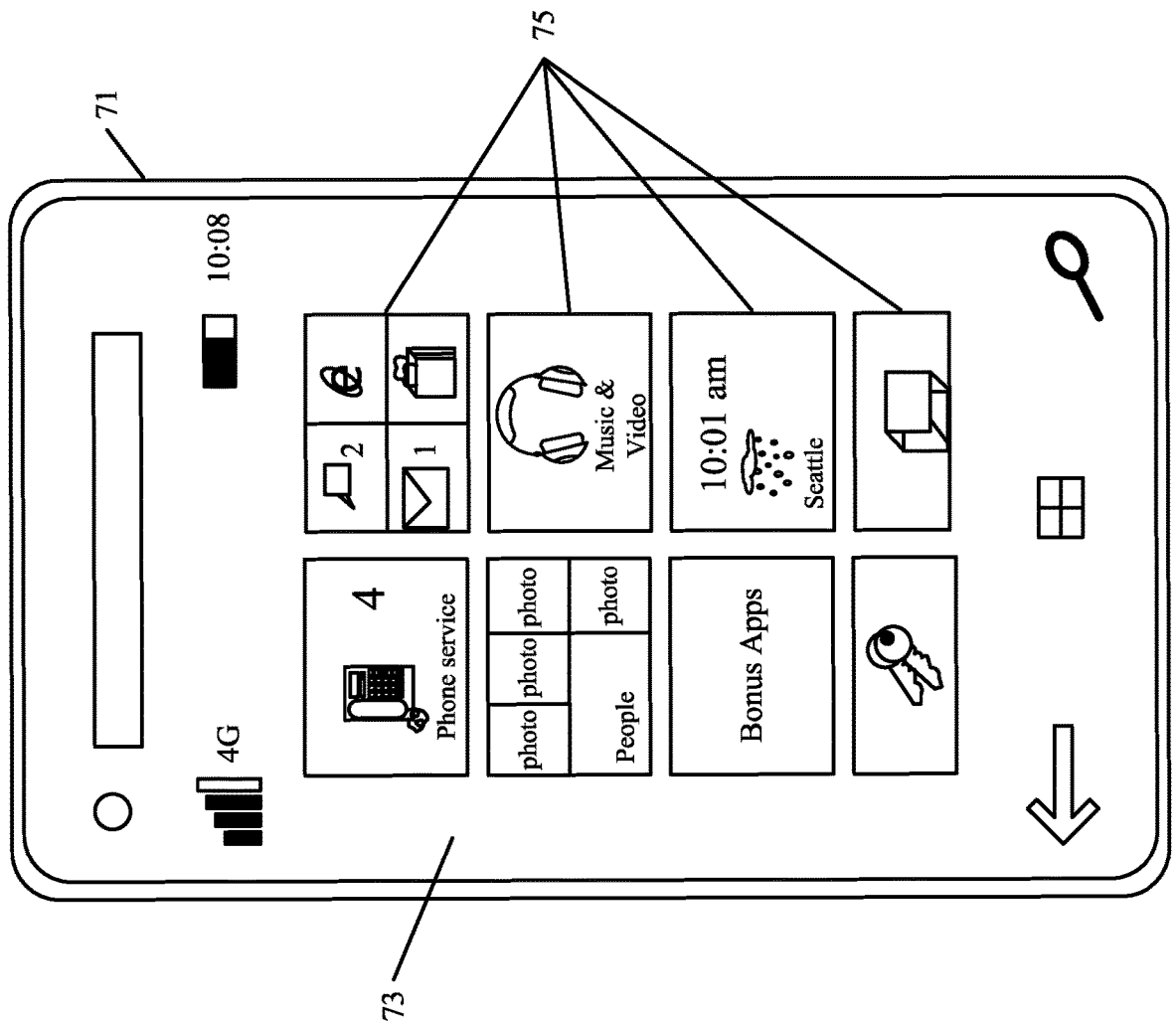

FIG. 8 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., a mobile work machine 100) for use in generating, processing, or displaying the outputs 630 or 730, or both, discussed above. FIGS. 9-10 are examples of handheld or mobile devices.

FIG. 8 provides a general block diagram of the components of a client device 16 that can run some components shown in previous figures, that interact with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, client system 24, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 9 shows one example in which device 16 is a tablet computer 1100. In FIG. 9, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 10 is similar to FIG. 9 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
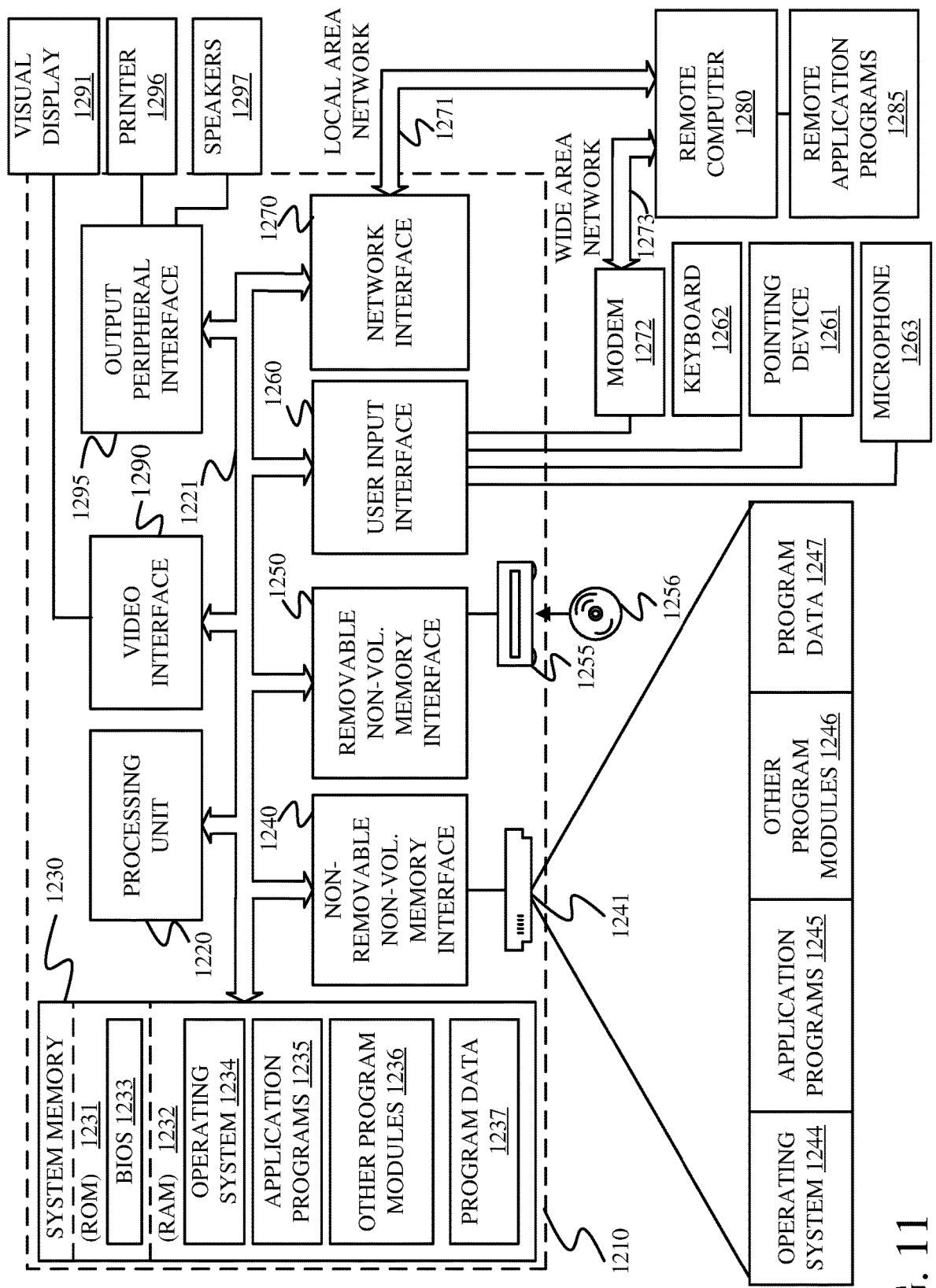
FIG. 11 is a block diagram showing one example of a computing environment that can be used in a worksite operation system architecture.

FIG. 11 is one example of a computing environment in which elements of previous figures described herein can be deployed. With reference to FIG. 11, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 11.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 11 illustrates operating system 1234, application programs 1235, other program modules 1236, and program data 1237.

The computer 1210 may also include other removable/non-removable volatile/nonvolatile computer storage media. By way of example only, FIG. 11 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 1210. In FIG. 11, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 11 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A worksite operation system comprising:
   one or more processors; and
   memory storing computer executable instructions, executable by the one or more processors, the computer executable instructions, when executed by the one or more processors, causing the one or more processors perform steps comprising:
   obtaining, from one or more image providers, a first set of one or more overhead images of a worksite, each overhead image of the first set of one or more overhead images of the worksite including values indicative of a characteristic of the worksite at different geographic locations across the worksite;
   identifying an image performance quality metric for each overhead image of the first set of one or more overhead images of the worksite based on an image performance quality model, wherein the image performance quality model models a relationship between overhead image values and characteristic values of the characteristic of the worksite;
   determining if at least one overhead image of the first set of one or more overhead images of the worksite can be selected, based on the identified image performance quality metrics for the at least one overhead image of the first set of one or more overhead images of the worksite;
   selecting, in response to determining that at least one overhead image of the first set of one or more overhead images can be selected, as a selected at least one image, the at least one overhead image of the first set of one or more overhead images of the of the worksite; and
   controlling a controllable subsystem of a mobile work machine based, at least, on the selected at least one image.

2. The worksite operation system of claim 1, wherein the computer executable instructions, when executed by the one or more processors, further cause the one or more processors to perform a step comprising:
   obtaining, in response to determining that none of the one or more overhead images of the first set of one or more overhead images of the worksite can be selected, as a selected image, based on the identified image performance quality metrics for the at least one overhead image of the first set of one or more overhead images of the worksite, a second set of one or more overhead images of the worksite, from the one or more image providers or a different one or more image providers, each overhead image of the second set of one or more overhead images of the worksite including values indicative of the characteristic of the worksite at the different geographic locations across the worksite.

3. The worksite operation system of claim 2, wherein the computer executable instructions, when executed by the one or more processors, further cause the one or more processors to perform a step comprising:
   selecting, in response to determining that none of the one or more overhead images of the first set of one or more overhead images of the worksite can be selected, as a selected image, based on the identified image performance quality metrics for the one or more overhead images of the first set of overhead images of the worksite, as a selected image, at least one of the one or more overhead images of the second set of one or more overhead images of the worksite.

4. The worksite operation system of claim 2, wherein the one or more image providers are one or more public image providers and wherein the one or more different image providers include at least one different public image provider or include one or more private image providers, or both.

5. The worksite operation system of claim 1, wherein the computer executable instructions, when executed by the one or more processors, further cause the one or more processors to perform a step comprising:
   obtaining, in response to determining that more than the at least one overhead image of the first set of one or more overhead images of the worksite are needed, from the one or more image providers or a different one or more image providers, a second set of one or more overhead images of the worksite, each overhead image of the second set of one or more overhead images of the worksite including values indicative of the characteristic of the worksite at the different geographic locations across the worksite.

6. The worksite operation system of claim 5, wherein the computer executable instructions, when executed by the one or more processors, further configure the one or more processors to perform the step of:
   selecting, in addition to the selected at least one image of the first set of one or more overhead images, at least one of the overhead images of the second set of one or more overhead images of the worksite.

7. The worksite operation system of claim 1, wherein identifying the image performance quality metric for each overhead image of the first set of one or more overhead images of the worksite based on the image performance quality model comprises:
- identifying one or more image features of each overhead image of the first set of one or more overhead images of the worksite; and
- providing the one or more image features of each overhead image of the first set of one or more overhead images of the worksite to the image performance quality model to obtain, as a model output, the image performance quality metric for each overhead image of the first set of one or more overhead images of the worksite.

8. The worksite operation system of claim 7, wherein the one or more image features comprise: (i) image resolution, (ii) image source sensor technology, (iii) timing information, or (iv) image value statistics or a combination of (i) image resolution, (ii) image source sensor technology, (iii) timing information, and (iv) image value statistics.

9. The worksite operation system of claim 1, wherein the first set of one or more overhead images of the worksite comprise one or more overhead multi-spectral images of the worksite, each overhead multi-spectral image of the one or more overhead multi-spectral images of the worksite including, as the values indicative of the characteristic of the worksite at different geographic locations across the worksite, multi-spectral values indicative of the characteristic of the worksite at different geographic locations across the worksite.

10. The worksite operation system of claim 1, wherein the computer executable instructions, when executed by the one or more processors, further cause the one or more processors to perform steps comprising:
- obtaining one or more historical overhead images, each historical overhead image of the one or more historical overhead images including values indicative of the characteristic;
- identifying one or more historical image features of each historical overhead image of the one or more historical overhead images;
- providing the one or more historical image features of each historical overhead image of the one or more historical overhead images to an in-training image performance quality model to obtain, as an in-training model output, an in-training image performance quality metric for each historical overhead image of the one or more historical overhead images;
- obtaining a set of historical values of the characteristic corresponding to each historical overhead image of the one or more historical overhead images;
- modeling the values of each historical overhead image of the one or more historical overhead images and the corresponding set of historical values of the characteristic to identify, for each historical overhead image of the one or more historical overhead images, a historical overhead image performance quality metric; and
- providing the historical image performance quality metrics for the one or more historical overhead images to the in-training image performance quality model to generate the image performance quality model.

11. A computer implemented method of controlling a mobile work machine, the computer implemented method comprising;
- obtaining, from one or more image providers, a first set of one or more overhead images of a worksite, each overhead image of the first set of one or more overhead images of the worksite including values indicative of a characteristic of the worksite at different geographic locations across the worksite;
- identifying an image performance quality metric for each overhead image of the first set of one or more overhead images of the worksite based on an image performance quality model;
- determining, based on the image performance quality metrics for the first set of one or more overhead images, a number of images in the first set of one or more overhead images that satisfy a threshold image performance quality;
- in response to a determination that the number of images is below a threshold number, obtaining a second set of one or more overhead images of the worksite, each overhead image of the second set of one or more overhead images of the worksite including values indicative of the characteristic of the worksite at the different geographic locations across the worksite;
- determining that at least one overhead image of the second set of one or more overhead images of the worksite can be selected, based on image performance quality metrics for the at least one overhead image of the second set of one or more overhead images of the worksite; and
- selecting, in response to determining that at least one overhead image of the second set of one or more overhead images of the worksite can be selected, as a selected at least one image, the at least one overhead image of the second set of one or more overhead images of the worksite; and
- generating one or more control signals to control the mobile work machine based, at least, on the selected at least one image.

12. The computer implemented method of claim 11 wherein the number of images is zero.

13. The computer implemented method of claim 11 and further comprising:
- selecting, in response to determining that none of the one or more overhead images of the first set of one or more overhead images of the worksite can be selected, as a selected image, based on the identified image performance quality metrics for the one or more overhead images of the first set of overhead images of the worksite, as a selected image, at least one of the one or more overhead images of the second set of one or more overhead images of the worksite.

14. The computer implemented method of claim 11 and further comprising:
- obtaining, in response to determining that more than the at least one overhead image of the first set of one or more overhead images of the worksite are needed, from the one or more image providers or a different one or more image providers, a second set of one or more overhead images of the worksite, each overhead image of the second set of one or more overhead images of the worksite including values indicative of the characteristic of the worksite at the different geographic locations across the worksite.

15. The computer implemented method of claim 14 and further comprising:
- selecting, in addition to the selected at least one image of the first set of one or more overhead images, at least one of the overhead images of the second set of one or more overhead images of the worksite.

16. The computer implemented method of claim 11, wherein the image performance quality model models a relationship between overhead image values and characteristic values of the characteristic of the worksite.

17. A mobile work machine comprising:
one or more processors;
memory storing computer executable instructions, executable by the one or more processors, the computer executable instructions, when executed by the one or more processors, causing the one or more processors perform steps comprising:
obtaining, from one or more image providers, a first set of one or more overhead images of a worksite, each overhead image of the first set of one or more overhead images of the worksite including values indicative of a characteristic of the worksite at different geographic locations across the worksite;
identifying an image performance quality metric for each overhead image of the first set of one or more overhead images of the worksite based on an image performance quality model, wherein identifying the image performance quality metric for each overhead image of the first set of one or more overhead images of the worksite based on the image performance quality model comprises:
identifying two or more image features of each overhead image of the first set of one or more overhead images of the worksite; and
providing the two or more image features of each overhead image of the first set of one or more overhead images of the worksite to the image performance quality model to obtain, as a model output, the image performance quality metric for each overhead image of the first set of one or more overhead images of the worksite; and
wherein the two or more image features comprise two or more of: (i) image resolution, (ii) image source sensor technology, (iii) timing information, and (iv) image value statistics;
determining if at least one overhead image of the first set of one or more overhead images of the worksite can be selected, as a selected image, based on the identified image performance quality metrics for the at least one overhead image of the first set of one or more overhead images of the worksite; and
selecting, in response to determining that at least one overhead image of the first set of one or more overhead images can be selected, as a selected image, the at least one overhead image of the first set of one or more overhead images of the of the worksite and controlling the mobile work machine based on the at least one selected image.

18. The mobile work machine of claim 17, wherein the computer executable instructions, when executed by the one or more processors, further cause the one or more processors to perform steps comprising:
obtaining, in response to determining that none of the one or more overhead images of the first set of one or more overhead images of the worksite can be selected, as a selected image, based on the identified image performance quality metrics for the one or more overhead images of the first set of one or more overhead images of the worksite, a second set of one or more overhead images of the worksite, from the one or more image providers or a different one or more image providers, each overhead image of the second set of one or more overhead images of the worksite including values indicative of the characteristic of the worksite at the different geographic locations across the worksite; and
selecting, in response to determining that none of the one or more overhead images of the first set of one or more overhead images of the worksite can be selected, as a selected image, based on the identified image performance quality metrics for the one or more overhead images of the first set of overhead images of the worksite, as a selected image, at least one of the one or more overhead images of the second set of one or more overhead images of the worksite.

19. The mobile work machine of claim 17, wherein the computer executable instructions, when executed by the one or more processors, further cause the one or more processors to perform steps comprising:
obtaining, in response to determining that more than the at least one overhead image of the first set of one or more overhead images of the worksite are needed, from the one or more image providers or a different one or more image providers, a second set of one or more overhead images of the worksite, each overhead image of the second set of one or more overhead images of the worksite including values indicative of the characteristic of the worksite at the different geographic locations across the worksite; and
selecting, in addition to the at least one selected image of the first set of one or more overhead images, as part of the one or more selected images, at least one of the overhead images of the second set of one or more overhead images of the worksite.

20. The mobile work machine of claim 17, wherein the image performance quality model models a relationship between overhead image values and characteristic values of the characteristic of the worksite.

* * * * *